United States Patent [19]

True, III et al.

[11] Patent Number: 4,715,046

[45] Date of Patent: Dec. 22, 1987

[54] FREQUENCY AGILE SIGNAL GENERATOR FOR EMULATING COMMUNICATIONS ENVIRONMENTS

[75] Inventors: Charles W. True, III, Annandale; John K. Brady, Sterling, both of Va.

[73] Assignee: Science Applications International Corporation, LaJolla, Calif.

[21] Appl. No.: 876,450

[22] Filed: Jun. 20, 1986

[51] Int. Cl.[4] .................... H04L 27/04; H04L 27/12; H04L 27/20

[52] U.S. Cl. ...................................... 375/61; 375/62; 375/67; 455/93

[58] Field of Search .................... 375/5, 61, 62, 67; 328/14; 370/11; 364/721, 718; 455/93, 118, 119, 76

[56] References Cited

U.S. PATENT DOCUMENTS

| | | | |
|---|---|---|---|
| 4,297,933 | 11/1981 | Nishimoto | 364/718 |
| 4,355,367 | 10/1982 | Masuzawa et al. | 328/14 |
| 4,438,503 | 3/1984 | White et al. | 364/721 |
| 4,486,846 | 12/1984 | McCallister et al. | 328/14 |

*Primary Examiner*—Robert L. Griffin
*Assistant Examiner*—Andrew J. Telesz, Jr.
*Attorney, Agent, or Firm*—Burns, Doane, Swecker & Mathis

[57] ABSTRACT

A frequency agile signal generator provided for emulating a communication signal of predetermined frequency and modulation characteristics including frequency hopping. The signal generator includes a digital controller such as a microprocessor or microcomputer for generating digital command signals specifying the desired characteristics of the output signal. In response to the digital command signals, a base digital frequency signal representing the desired base or center frequency of the output signal is generated by a number controlled oscillator in response to a digital frequency control signal. The digital command signals also control the generation of an analog modulation signal having desired modulation characteristics. For frequency modulation, the analog modulation signal is converted to a digital signal in the frequency domain and is algebraically summed with the frequency control signal to control the frequency of the number controlled oscillator output signal as a function of both the digital frequency control signal and the digital modulation signal. The number controlled oscillator output signal is converted to analog form to provide an analog output signal. The analog output signal can be amplitude modulated and/or attenuated as commanded by the digital command signals. For amplitude modulation, the analog modulation signal in the time domain is used directly under the control of the digital command signals as a mixer input to amplitude modulate the analog output signal or for on/off keying.

19 Claims, 19 Drawing Figures

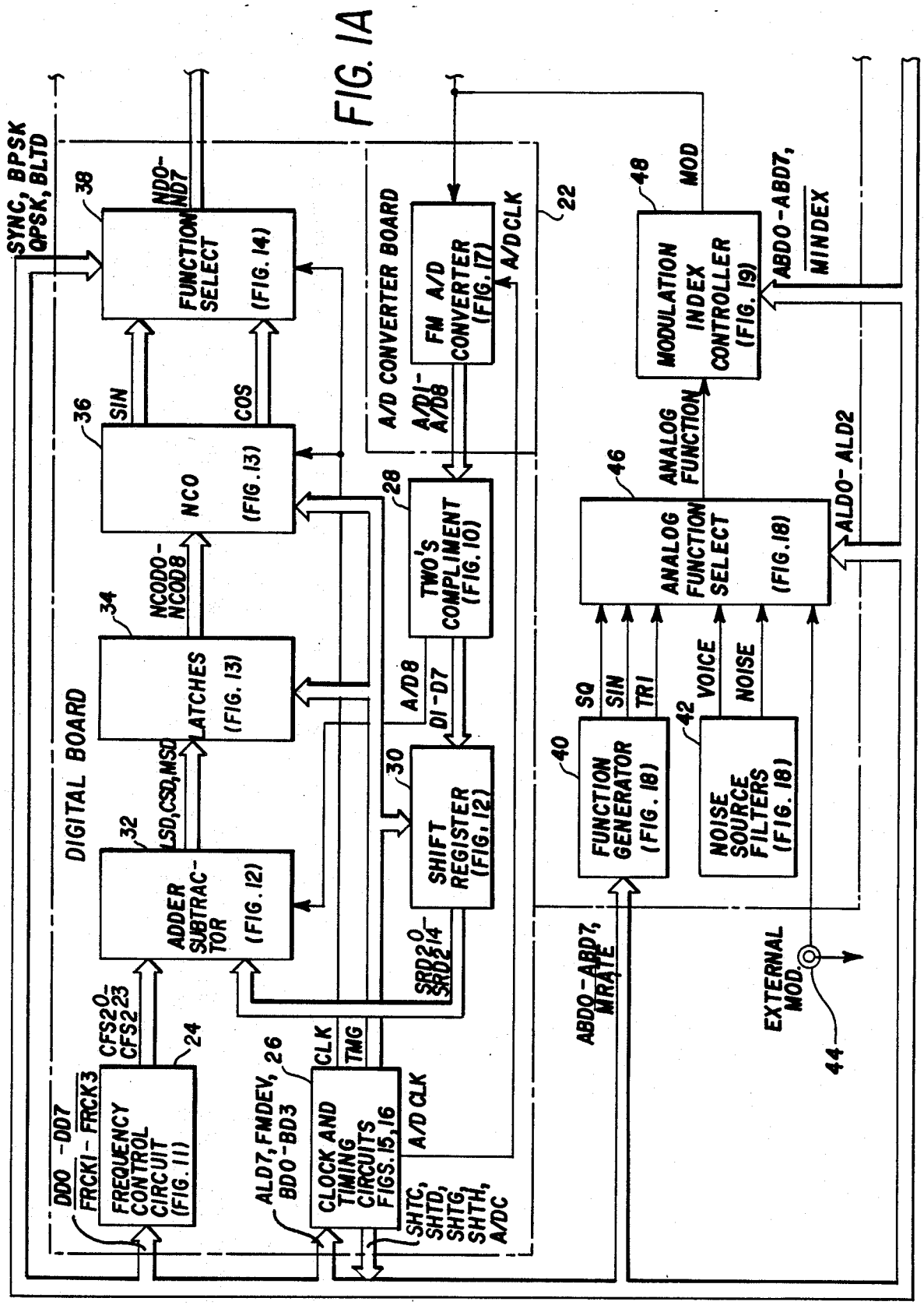

TWO'S COMPLEMENT

FREQUENCY CONTROL CIRCUIT

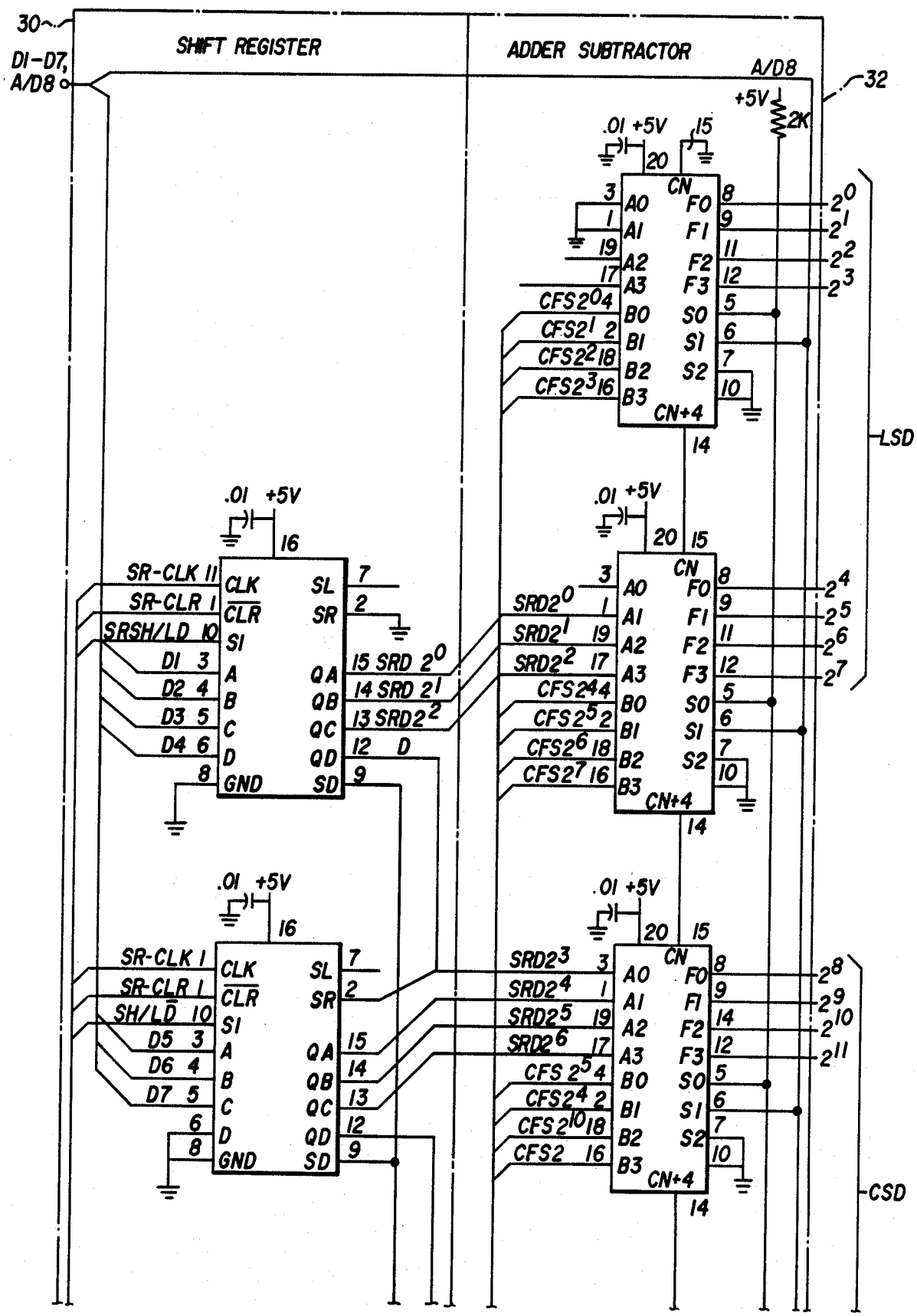
FIG.12A   SHIFT REG. & ADDER-SUBTRACTOR

SHIFT REG. & ADDER-SUBTRACTOR

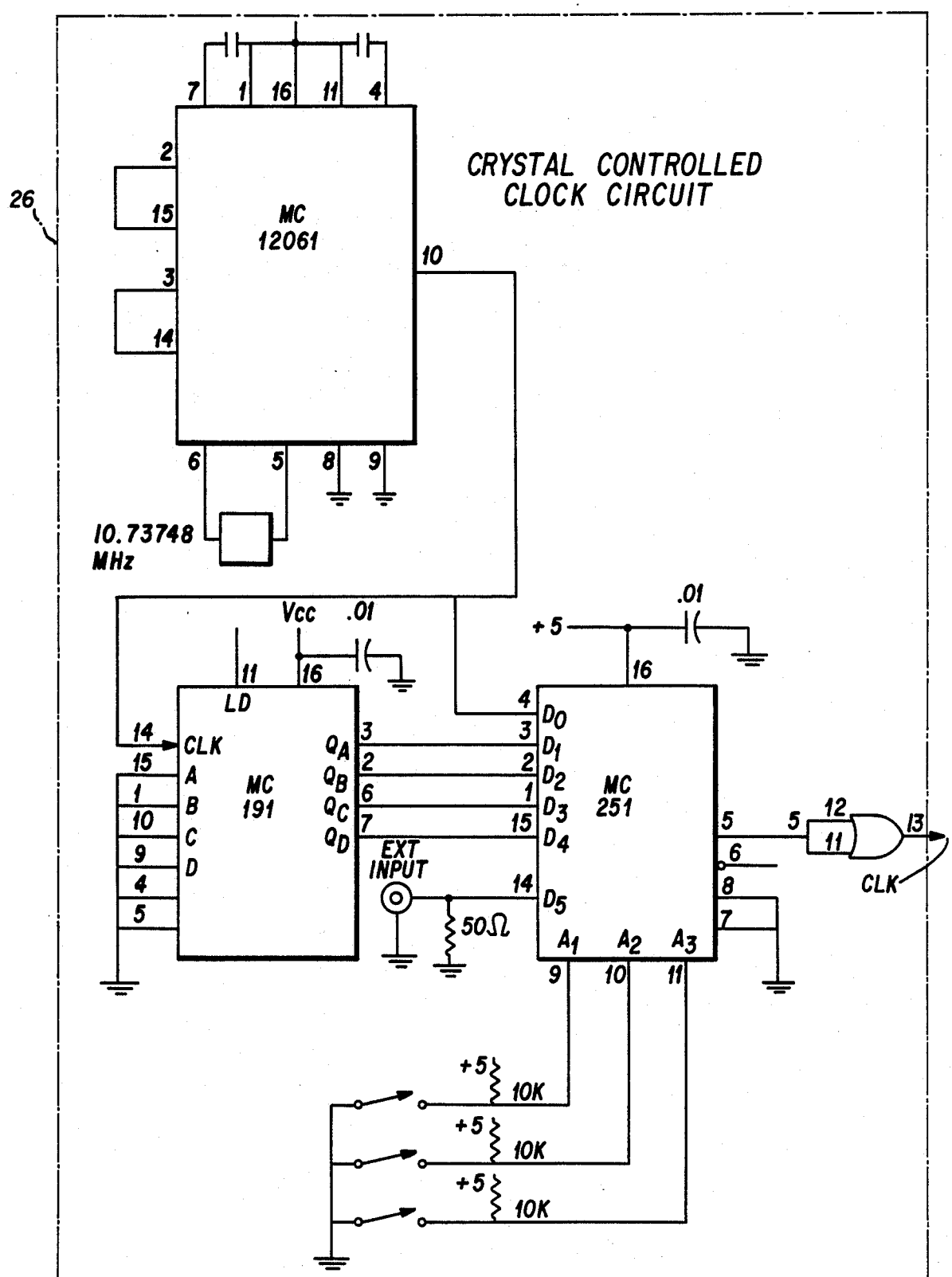
FIG. 15 CLOCK CIRCUIT

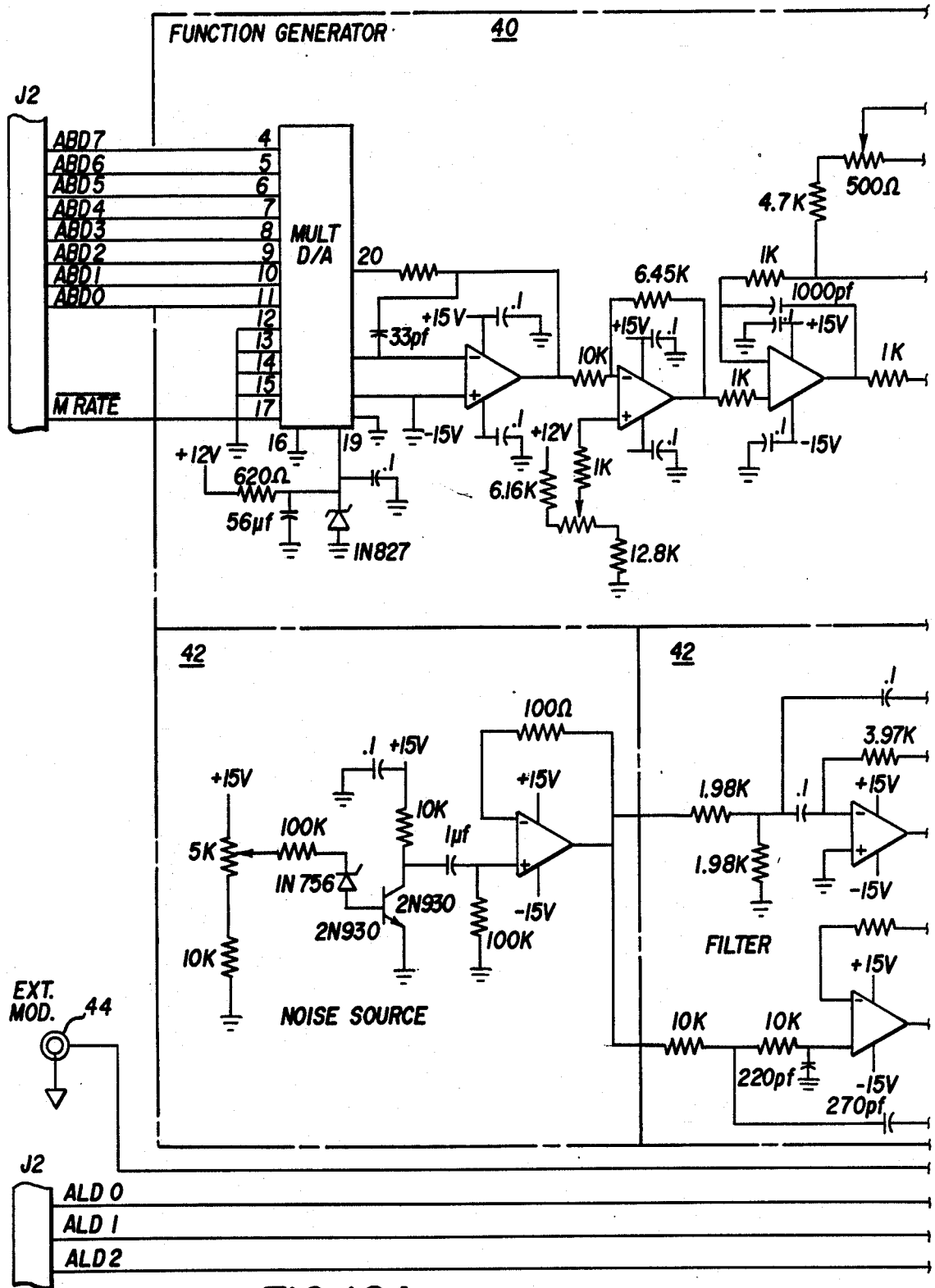
FIG. 18A ANALOG BOARD

FREQUENCY AGILE SIGNAL GENERATOR FOR EMULATING COMMUNICATIONS ENVIRONMENTS

BACKGROUND OF THE INVENTION

The present invention relates to frequency agile signal generators and, more particularly, to a method and system for generating signals which emulate complex communication signals and signal environments.

Modern radar and communication systems employ diverse signal frequencies and modulations ranging from relatively common amplitude modulation (AM), frequency modulation (FM), or phase modulation (PM) signals to extremely complex combinations of modulation, frequency hopping, and the like. To provide a realistic environment for test, evaluation, and development of such systems, and to accurately produce such signals for training or other similar purposes, signal generators capable of emulating diverse and complex types of signals are required.

Obviously, a wide range of diverse signals can be produced by individual signal sources, each designed to produce a particular waveform and arranged so that the individual signal generator outputs or combinations thereof can be selected. Of course, such an approach may require considerable hardware filling several equipment racks. As a result, such signal generating systems are expensive, complex to operate and maintain, require considerable space, and lack mobility. Also, an arrangement of individual signal sources has limited versatility and requires the addition of specific signal sources to expand its capabilities.

On the other hand, a single source generator, programmable to provide a variety of signal waveforms and modulation types, typically cannot provide the wide variety of signals encountered in modern radar and communication systems. Thus, signal generators for emulating radar and/or communication signals may use several analog and digital signal sources and may combine and modulate the different signals in a variety of ways to produce a desired output waveform. Even then, however, the equipment may be extensive in size and quite limited in its capability to reproduce modern communications signal formats.

One known approach, exemplified by the CSS-20 series of Communication Signal Simulator available from Lockheed Electronics, provides basic AM, FM, and PM signal channels which can be selected to provide a desired basic generator output waveform. Each channel includes a variety of controls and/or sources to modify the basic modulation so as to provide such capabilities as suppressed carrier (SC) AM, narrowband and wideband FM (NBFM and WBFM), and a variety of pulse modulations such as pulse width modulation (PWM), pulse amplitude modulation (PAM), pulse position modulation (PPM), and the like. Simulation of modern communication systems, however, requires far greater variety of signal waveforms and modulation characteristics. Moreover, there is a need for very fine, dynamic control of signal parameters over a wide range of variation yet with a capability characterized by speed and ease of parameter selection.

OBJECTS AND BRIEF SUMMARY OF THE INVENTION

It is accordingly an object of the present invention to provide a novel, extremely versatile, compact communications environment signal generator and method for producing signals encountered in modern types of radar and communication systems.

It is another object of the present invention to provide a novel method and system for program controlled generation of a wide variety of complex communication signals through simple input commands which digitally alter the output signal characteristics.

It is yet another object of the present invention to provide a novel signal generator and method whereby complex signal formats can be accurately replicated with a minimum of hardware and at speeds encountered in complex radar and communication systems.

It is still another object of the present invention to provide a novel method and system for high resolution generation of a wide variety of communication signals with a minimum of hardware.

It is a further object of the present invention to provide a novel, easy to use, digital signal generator and signal generating method with extremely fine static and dynamic control of signal parameters over a wide range of variation so as to provide the capability to produce the most complex of modern communication signals.

Briefly, according to the present invention a signal generator is provided for producing an output signal which emulates a communication signal of predetermined frequency and modulation characteristics. The signal generator includes a digital controller such as a microprocessor or microcomputer for generating digital command signals specifying the desired characteristics of the output signal. In response to the digital command signals, a base digital frequency signal representing the desired base or center frequency of the output signal is generated. The digital command signals also control the generation of an analog modulation signal having desired modulation characteristics. The analog modulation signal is used for amplitude modulation and is converted to a digital signal for frequency modulation of the digital base frequency signal as directed by the digital command signals.

More specifically, the base digital frequency signal is generated by a number controlled oscillator under the control of a digital frequency control signal. For frequency modulation, the analog modulation signal is converted to a digital signal in the time domain and is transformed to the frequency domain to produce a digital modulation signal. The frequency domain digital modulation signal is algebraically summed with the frequency control signal to control the frequency of the number controlled oscillator output signal as a function of both the digital frequency control signal and the digital modulation signal.

The number controlled oscillator output signal is converted to analog form to provide an analog output signal which is applied through a mixer and an attenuator, as well as suitable amplifier circuitry, to an output terminal. The analog output signal can be amplitude modulated and/or attenuated as commanded by the digital command signals. For amplitude modulation, the analog modulation signal in the time domain is used directly under the control of the digital command signals as a mixer input to amplitude modulate the analog output signal.

BRIEF DESCRIPTION OF THE DRAWINGS

The foregoing and other objects and advantages of the present invention will become apparent to one skilled in the art to which the invention pertains from the following detailed description when read in conjunction with the appended drawings in which:

FIG. 15 is a schematic diagram of the clock circuit on the digital board of FIGS. 1 and 4;

DETAILED DESCRIPTION

A preferred embodiment of the signal generator according to the present invention is fully set forth in the block diagrams and flow charts of FIGS. 1 to 4 and is schematically depicted in great detail in FIGS. 5 to 19.

Figure 1B:
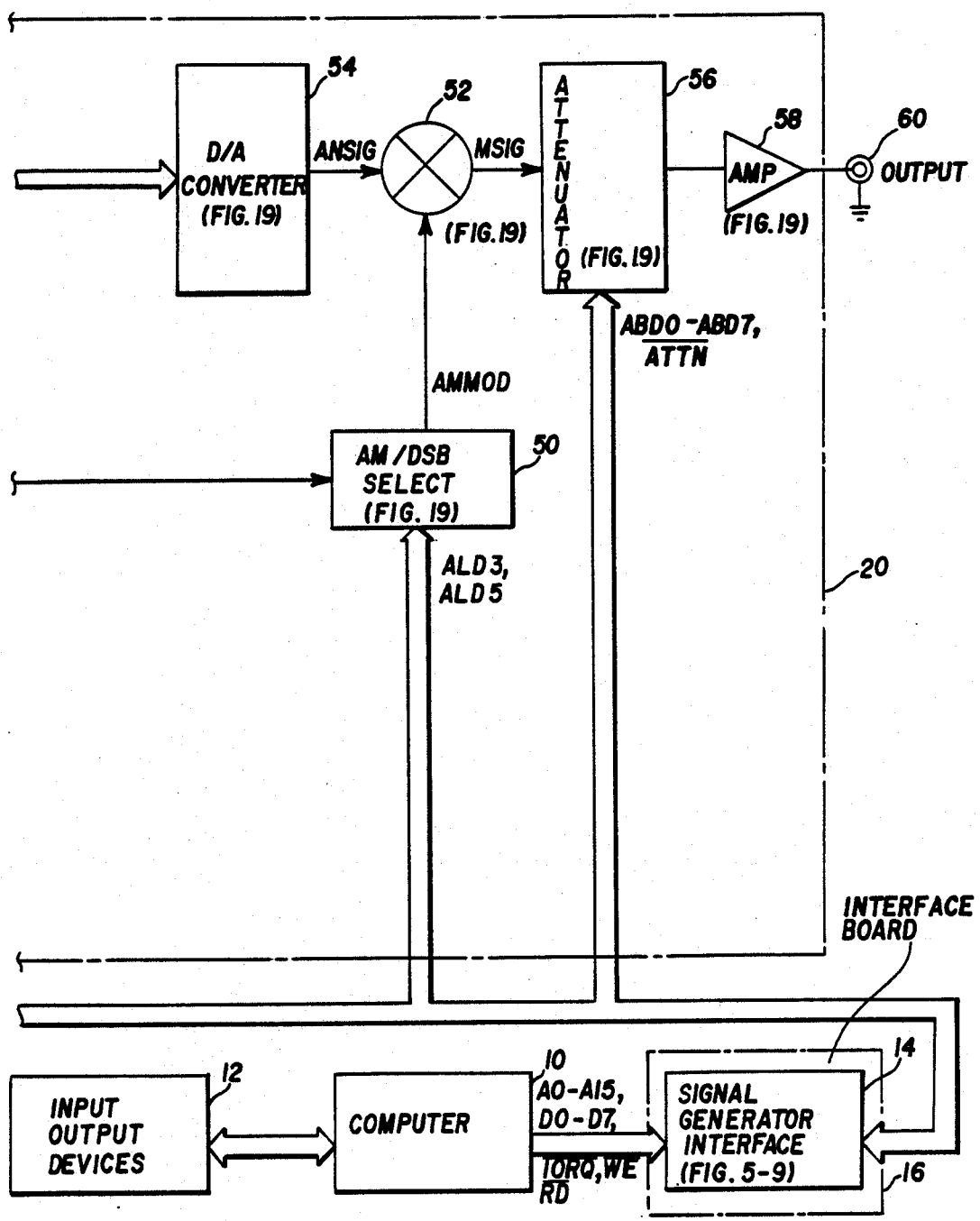
FIG. 1 is a functional block diagram of a signal generator according to the present invention.
Figure 4:
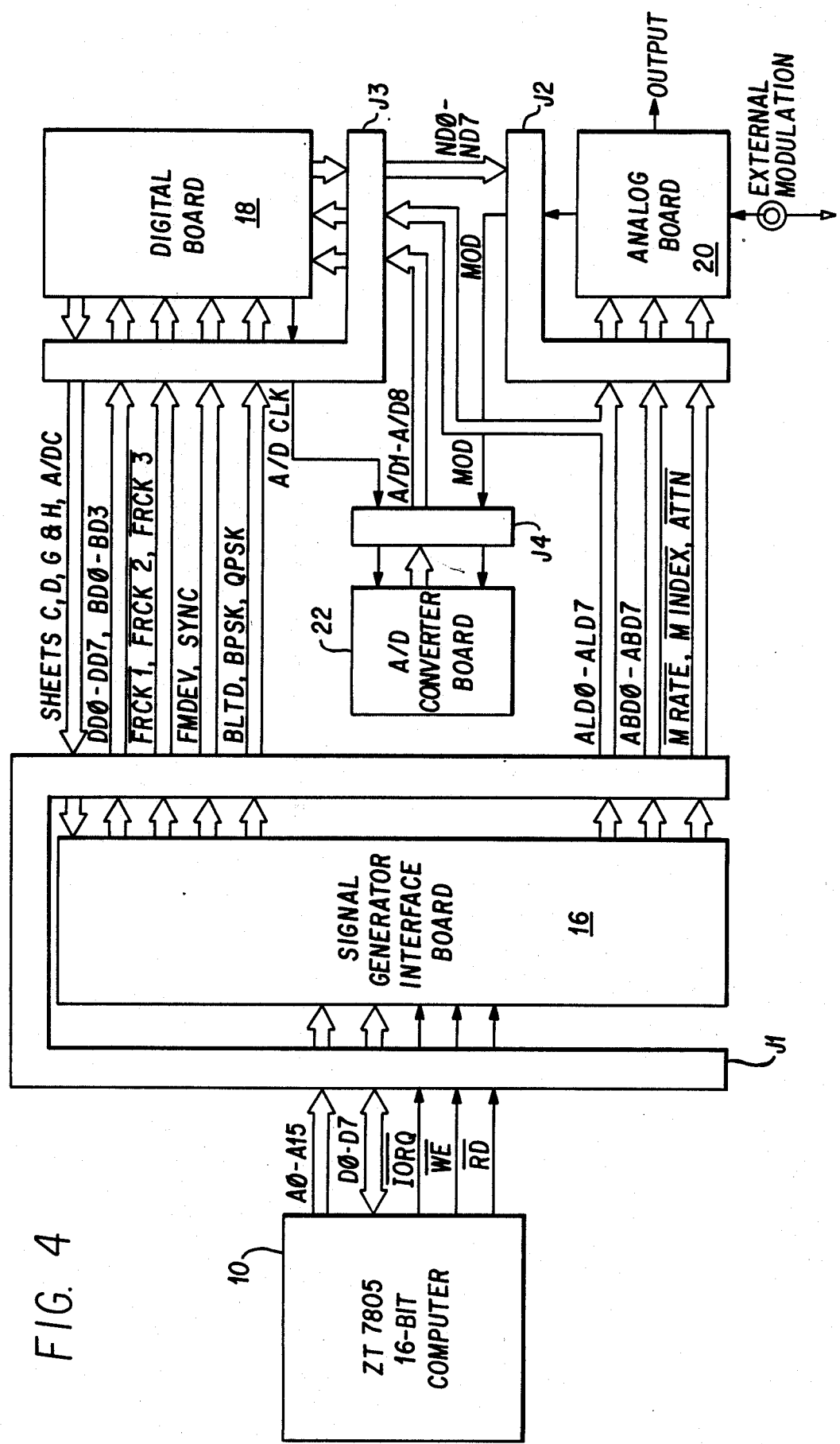
FIG. 4 is a functional block diagram illustrating the circuit board and connector arrangement of a specific embodiment of the signal generator of FIG. 1.

Referring generally to FIGS. 1 and 4, a conventional computer 10 is connected to conventional input/output devices 12 such as a keyboard and display. The computer 10 also is connected via interface connector J1 to a signal generator interface 14 generally comprising conventional interface circuits on an interface board 16 and illustrated in greater detail hereinafter in FIGS. 5-9. The computer 10, preferably a commercially available ZIATECH Model ZT-7805, 8-bit single board computer, supplies its normal address signal A0–A15, data signal D0–D7, input/out control signals IORQ(−), and write/read control signals, WE(−) and RD(−) to the interface 14 via connector J1. As will be seen hereinafter, the bus for the data signal D0–D7 also provides a path for data from the interface board 16 to the computer 10.

The interface 14, in response to the computer output signals, generates appropriate command signals to control the signal generator digital and analog circuit boards 18 and 20, also described hereinafter in detail. In this regard, the signal generator interface board provides various digital command signals to the digital board 18 and also receives certain timing information from the digital board via connector J3. Similarly, various command signals are provided to the analog board 20 via connector J2.

An analog-to-digital (A/D) converter board 22 converts the analog signal from the analog circuit board 20 to digital form for use by the digital circuit board 18 as will be discussed hereinafter. As can be seen in FIGS. 1 and 4, the analog signal from the analog board 20 is applied to the A/D converter board via connector J4. Similarly, timing for the A/D converter board 22 is provided from the digital board 18 via connector J4, and the digital output from the A/D converter board 22 is supplied to the digital board.

Interface Board

The interface board 16 contains the circuits which interface the computer 10 with the signal generator hardware. Included on the interface board are registers, memories, decoders, and other typical digital logic circuits to receive the computer output signals and generate digital command signals appropriate for the signal generator hardware.

Specifically, the interface board 16 receives the computer address, data, and control signals mentioned above and provides digital commands to control the operation of the digital and analog boards. Command signals are supplied to the digital board 18 to provide for timing control, frequency control, and output signal selection as will be explained hereinafter. Moreover, in the illustrated embodiment, the interface board is used for memory expansion through the provision of a memory such as an EPROM which can be accessed by the computer over the data bus, i.e. data signals D0–D7 from the interface board. It will be appreciated that such interface and memory expansion functions are well known to those skilled in the computer control art. The particular structural interface arrangement of the present embodiment is illustrated in detail in FIGS. 5-9, but it should be understood that other interface arrangements with more extensive memory or the like may be provided as desired for a particular application.

Digital Board

The digital board 18 contains digital circuits which generate a digital output signal of desired base or center frequency and modulation characteristics. Digital command signals DD0 to DD7 and FRCK1(−) to FRCK3(−) are supplied from the interface 14 to a frequency control circuit 24 comprising conventional signal buffer and latch circuits described hereinafter. The frequency control circuit 24 generates a twenty four bit word CFS2⁰–CFS2²³ by latching three eight-bit, frequency-related data words, e.g. three consecutive commands D0–D7, as they are received from the interface 14. This 24-bit word serves to set the base frequency of the signal generator output signal as will become apparent.

Clock and timing circuits 26 receive control data in the form of commands ALD7, FMDEV, and BD0–BD3 from the interface 14 and provide the clock signal CLK, the analog-to-digital converter clock A/D CLK, and the timing signals TMG. These clock and timing signals control the timing of the circuits on the digital board 18 as well as the timing of the FM A/D converter on the converter board 22.

A two's complement circuit 28 receives a digital output signal A/D1–A/D8 from the FM A/D converter on board 22 and provides the two's complement D1–D7 of the first seven A/D bits and the A/D8 signal.

The output signals D1–D7 from the two's complement circuit 28 are supplied to a shift register 30, and the A/D8 output signal from the two's complement circuit 28 is supplied to an adder/subtractor 32. The adder/subtractor 32 also receives the $SRD2^0$–$SRD2^{14}$ output signals from the shift register 30 and the $CFS2^0$–$CFS2^{23}$ output signals from the frequency control circuit 24.

A twenty-four bit data word, consisting of three 8-bit words LSD, CSD, and MSD, is produced by the adder/subtractor 32 and latched by latches 34. As will be seen hereinafter, the latches 34 provide thirty-two bits, the eight least significant bits of which are all binary zeros and the next twenty-four bits of which are the 8-bit LSD, CSD, and MSD words, respectively. Twenty-eight bits of the thirty-two bit word in the latches 34 are provided to a number controlled oscillator 36, in response to the timing signals TMG, to control the frequency of the oscillator output signal.

The number controlled oscillator (NCO) 36 generates two 8-bit digital words SIN and COS which digitally represent, in any clock period, the instantaneous values of the respective sine and cosine of a signal having the frequency commanded by the twenty-eight bit word latched in the latches 34. The latch data supplied to the NCO is updated at a rate determined by the clock frequency so the frequency of the signal represented by the NCO output signals can be changed at a very high rate over a wide band.

For example, using a 10 MHz clock and a 28 bit resolution model ST-1172 NCO available from Stanford Telecommunications, Inc. of Santa Clara, Calif., the digital output of the NCO may represent output frequency may be varied over a range from DC to 5 MHz (i.e. half the clock frequency) with a resolution of up to $1.6 \times 10^{-8}$ of the clock frequency, depending upon the number of input command bits used for frequency control. In the illustrated embodiment where the eight least significant bits from the latches 34 are not changed (i.e. are not used for frequency control), the resolution is less than the above-mentioned maximum capability but is sufficient to provide communication signal waveforms of the most complex types with excellent frequency resolution.

The SIN and COS output signals from the NCO 36 are applied to a function select circuit 38 which receives the SYNC, BPSK, QPSK, and BLTD signals from the interface 14 and the CLK signal from clock and timing circuits 26. The function select circuit 38 selects the sine or cosine function or the inverse of the sine or cosine function. The selected signal, in digital form, is supplied by the function select circuit to the analog board 20.

Analog Board

The analog board 20 contains the analog circuits which provide various analog functions for signal modulation and which convert the selected digital NCO signal to the desired analog form for output to a transmitter or other output device. The analog board 20 also provides the capability of amplitude modulating and/or alternating the signal generator output signal.

Modulation signals for frequency or amplitude modulation (FM or AM) are generated by a function generator circuit 40 and a noise source and filter circuit 42. Alternatively, an external modulation source may be supplied via an input jack 44. In this connection, the function generator 40 may be controlled by the analog board command signals ABD0–ABD7 and MRATE(−) from the interface 14. The noise source and filters 42 conventionally provide noise or voice band signals, and any suitable external modulation source such as a microphone for voice input may be supplied via jack 44.

The available analog signals from the circuits 40 and 42 and the input jack 44 are supplied to an analog function select circuit 46 which selects one of the modulation signals under the control of command signals ALD0–ALD2 from the interface 14. The selected analog function is supplied to a modulation index controller 48 which also receives command signals ABD0–ABD7 and MINDEX(−) from the interface 14.

The modulation signal MOD from the modulation index controller 48 is supplied to the FM A/D converter on board 22 and to an AM/DSB select circuit 50. The AM/DSB select circuit 50 also receives the command signals ALD3 and ALD5 from the interface 14 and provide an amplitude modulation control signal AMMOD to a conventional mixer 52. The mixer 52 also receives the analog version ANSIG of the selected NCO signal NC0–NC7 from a digital-to-analog (D/A) converter 54, and provides an output signal MSIG to a controllable attenuator 56. The attenuator 56 is controlled by the signals ABD0–ABD7 and ATTN(−) from the interface 14, and provides a controllably attenuated output signal through a conventional amplifier 58 to an output jack 60.

A/D Converter Board

The A/D converter board 22 contains the analog to digital (A/D) converter circuit which converts the modulation signals MOD to digital form. As will be appreciated, the MOD signal, in order to be used for FM modulation, must be converted to digital form and supplied to the adder/subtractor circuit 32. The FM A/D converter circuit converts the MOD signal to digital form in the time domain and, as will be seen hereinafter, that time domain signal is converted to the frequency domain, is algebraically summed with the frequency control data, and is used to control the NCO.

General Operation

Figure 2:
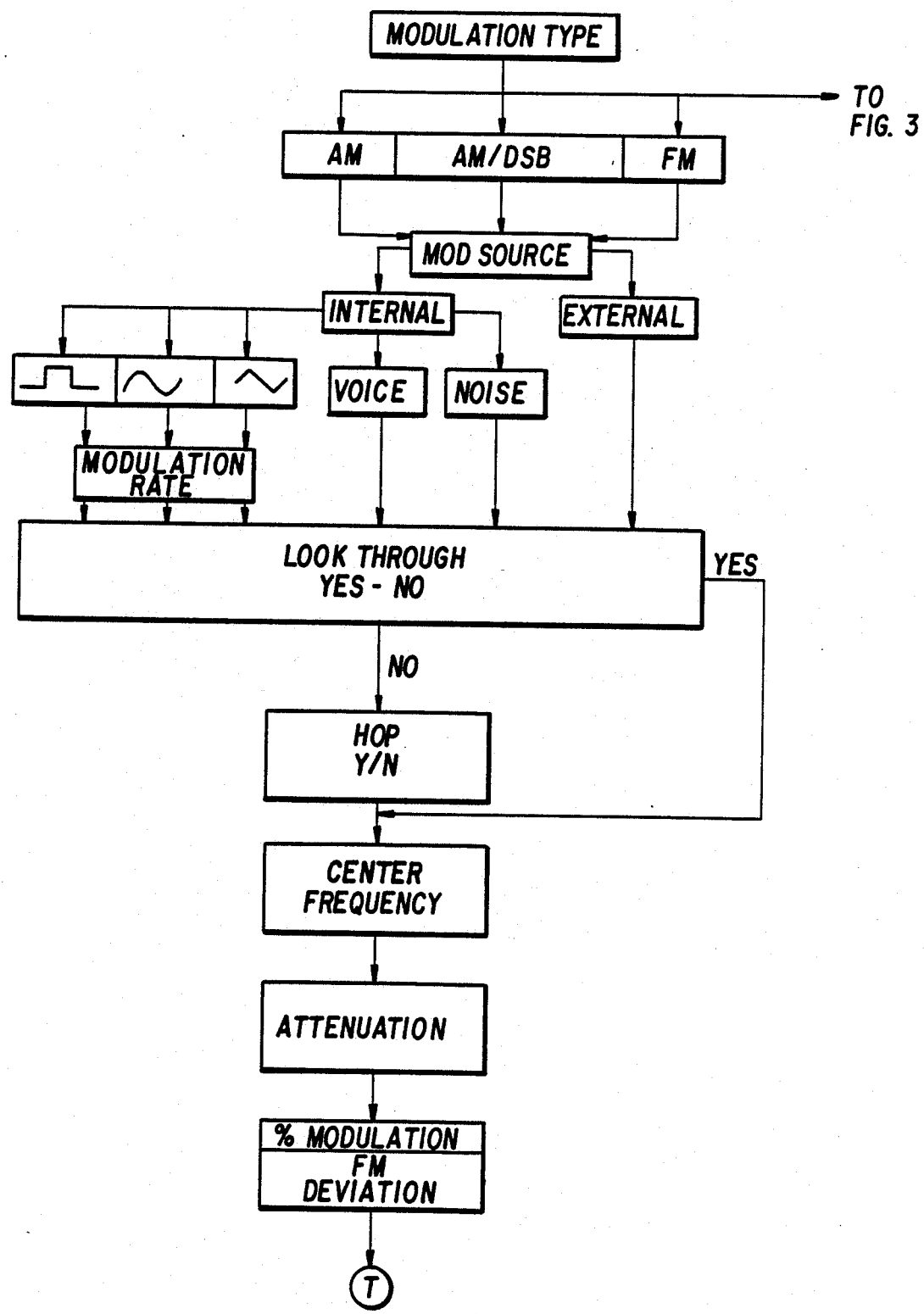
FIGS. 2 and 3 are flow charts illustrating the operation of the signal generator of FIG. 1.
Figure 3:
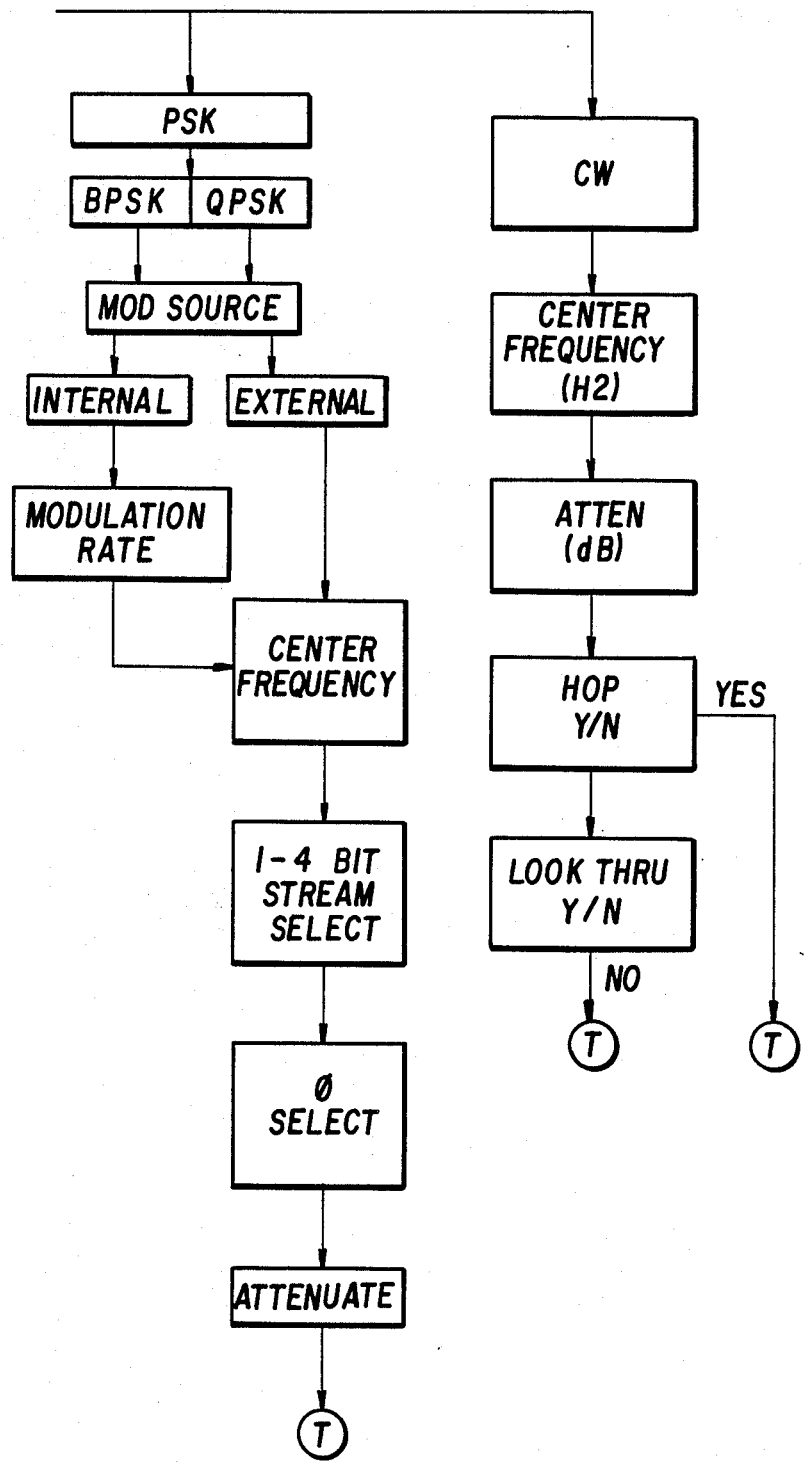

The operation of the signal generator will be described with reference to the block diagrams of FIGS. 1 and 4 and the flow charts of FIGS. 2 and 3 to facilitate an understanding of the invention. The model ZT-7805 computer 10 is provided with a suitable, preferably menu-driven program which permits the operator to selectively specify the modulation type and, depending upon the selected modulation type, the other characteristics necessary to provide a desired output signal. Thus, as is shown in FIGS. 2 and 3, the operator may specify single or double side-band amplitude modulation (AM or AM/DSB), frequency modulation (FM), phase shift keyed modulation (PSK), or continuous wave (CW) output.

If one of AM, AM/DSB, or FM is selected (FIG. 2), the operator then selects the modulation source (internal or external), the modulation rate, the modulation index or percent, the attenuation value, and the center frequency. The operator also specifies whether or not the lookthrough function and frequency hopping are to be selected. If the lookthrough function is selected, the output signal is interrupted periodically as might occur in a jamming situation where noise is transmitted for jamming purposes, and the transmitted noise is periodically interrupted to determine if the source being jammed is still on the air. Frequency hopping, involving rapid and large frequency changes in a psuedo-random or other relatively secure manner, is achievable, as will be seen hereinafter, because of the high degree of frequency agility provided by the present invention.

If PSK is selected as the modulation type, the in phase (I) or quadrature phase (Q) base frequency signal is specified together with the modulation source, modulation rate, and center frequency. The operator also selects among one of four bit streams and specifies the phase of the bit stream relative to the base frequency signal. Additionally, the attenuation value of the output is set. For CW signal generation, the center frequency and the attenuation value are specified, and the hop and lookthrough functions are specified.

The computer 10 outputs the signal characteristics specified by the operator to the signal generator interface 14. The interface generates appropriate command signals as will be seen in connection with FIGS. 5–9, and those command signals are supplied over suitable connectors to the other signal generator boards.

The analog command signals specify to the analog board the analog function to be generated and supplied for modulation purposes. If a particular analog function is to be generated, the modulation rate command MRATE(−) strobes the analog command data ABD0–ABD7 into the function generator 40 and the function generator produces the commanded analog output waveform. The analog commands ALD0–ALD2 control the function select circuit 46 to select the desired one of the available analog signals and the modulation index controller 48 selectively determines the amplitude of the modulation signal in response to the analog command data ABD0–ABD7 strobed into the controller 48 by the MINDEX(−) command.

The modulation signal MOD is provided to the AM/DSB select circuit 50 and the FM A/D converter circuit 22 for amplitude and frequency modulation, respectively. For AM, the ALD3 and ALD5 commands supply the modulation signal to the mixer 52. In addition, the AM/DSB select circuit may be controlled to bias the mixer off so as to selectively turn off the output signal for a desired period or for repeating periods as when the lookthrough function is selected.

For FM, the MOD signal is converted to digital form. It will be appreciated that each digital sample of the MOD signal represents the amplitude of that signal in the time domain. In other words, the output signal from the analog to digital converter board 22 is a digital representation of the time varying MOD input signal. Since the frequency control signal to the NCO is in the frequency domain, i.e. specifies an instantaneous value of frequency, the digital modulation signal from the FM A/D converter must be converted to the frequency domain before it is combined with the base or center frequency control signal. For this purpose, the shift register 30 is provided. First, however, the A/D converter output signal is converted to its two's complement D1–D7 by the two's complement circuit 28. Therefore, the output signal SRD-SRD$^{14}$ from the shift register 30 is the two's complement of the digital modulation signal in the frequency domain.

The digital base or center frequency control signal is a twenty-eight bit word comprising three 8-bit words (bytes) and one 4-bit word (nibble) wherein all four bits of the 4-bit word are the least significant bits and are always zeroes. To produce a digital base or center frequency control signal to control the NCO, three 8-bit, frequency control words of command data DD0–DD7 are strobed into the frequency control circuit 24 by the FRCK1 (−)–FRCK3(−) command signals. The resulting twenty-four bit word CFS–CFS$^{23}$ is supplied to the adder/subtractor 32 together with the digital modulation signal SRD–SRD$^{14}$ from the shift register 30. Since both digital input signals to the adder/subtractor 32 represent frequency, they may be algebraically combined to produce a 24-bit modulated digital base frequency control signal. The three 8-bit words LSD, CSD, and MSD of the modulated digital base frequency control signal are provided to latches 34. As will be seen in FIG. 13, the latches 34 comprise four 8-bit latches and the LSD, CSD, and MSD signals are latched in the three higher order or most significant latches. The least significant four bits of the 28-bit digital frequency control signal are not used for control, i.e. are all zeros, since the frequency control resolution is sufficient without using the least significant four bits.

The latches 34 are connected to the 8-bit input bus of the NCO 36 and the frequency control signal is transferred to the NCO a word at a time. The NCO produces a digital output signal with a base frequency specified by the digital frequency control signal from the frequency control circuit 24 and modulation specified by the digital modulation signal from the shift register 30. The NCO produces two trigonometric functions, the sine (SIN) and cosine (COS), with a frequency specified by the digital input. The SIN and COS signals are supplied to the function select circuit 38 where any one of four phases (0, 90, 180, or 270) of the digital output signal can be selected. This is particularly useful for PSK modulation since this allows the operator to select the phase angle at which the phase of the output signal changes, e.g. the zero crossing point or some other phase angle. In this regard, the SYNC, BPSK, QPSK, and BLTD signals are provided to the function select circuit to control phasing for such modulation types as binary phase shift keying (BPSK) and quadriphase shift keying (QPSK) as a function of the characteristics selected by the operator.

The selected phase of the digital output signal is supplied to the D/A converter 54 on the analog board for conversion to an analog output signal. The analog output signal from converter 54 is then applied through the mixer 52, attenuator 56 and amplifier 58 to allow for selective amplitude modulation and attenuation as was previously noted.

It will be appreciated that the timing of the operations performed by the digital board as well as data flow to and from the computer 10 via the interface 14, must be controlled in relation to an accurate clock. Accordingly, a crystal controlled clock and its associated timing circuits (circuit 26) receive commands from the interface 14 and synchronizes all digital timing. The clock and timing signals are supplied to various circuits on the digital board, as well as the A/D converter board, and certain timing signals SHTC-SHTH and A/D C are sent to the interface 14.

As was previously mentioned, the clock frequency in the illustrated embodiment is 10 MHz. This clock frequency will determine the frequency range of the output signal, the upper limit being one-half the clock frequency with the particular NCO used in the preferred embodiment. It will be appreciated that a different clock frequency can be chosen if a different frequency range is desired.

Interface Board Detail (FIGS. 5-9)

The signal generator interface 14 on board 16 is illustrated in greater detail in FIGS. 5 to 9. In general, the signal generator interface 14 is the circuit that converts the computer commands into command signals specific to the other signal generator circuits. In addition, the interface board contains semiconductor memory to expand the overall memory availability. In this regard, therefore, the signal generator interface performs typical interface and memory expansion functions like other conventional external computer interfaces.

With reference to FIGS. 5 to 9, a sixteen bit address signals A0 to A15, input/output and read/write control signal IORQ(−), RD(−), and WE(−) are supplied from the computer 10 to the interface 14 via interface connector J1. In addition, the 8-bit computer data bus carries data D0–D8 from the computer 10 to the interface 14 and from the interface 14 to the computer 10 (see FIG. 6).

The individual components of the interface circuit as well as other circuits on the digital and analog boards are conventional and are illustrated using normal logic conventions. Therefore, the components and their functions will not be described in any particular detail. It should be noted, however, that input and output signals to or from the interface board are shown as being supplied to interface connector J1 to coordinate the schematics with the block diagrams of FIGS. 1 and 4. Signals used internally on the interface board are given signal names so that they can be traced to the internal circuits where they are used.

Figure 5A:
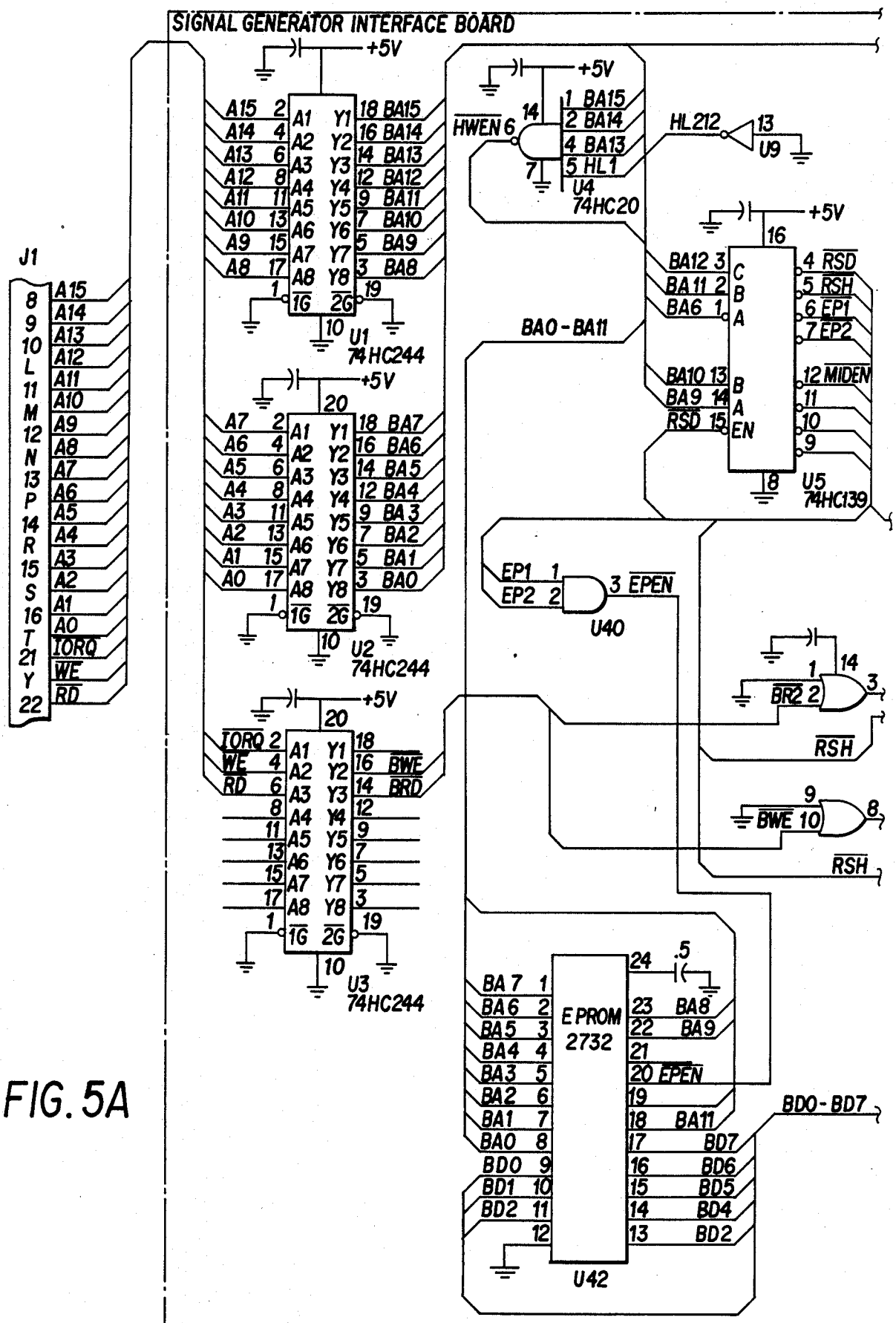
FIGS. 5 to 9 are schematic diagrams of the interface circuits on the interface board of FIGS. 1 and 4.
Figure 5B:
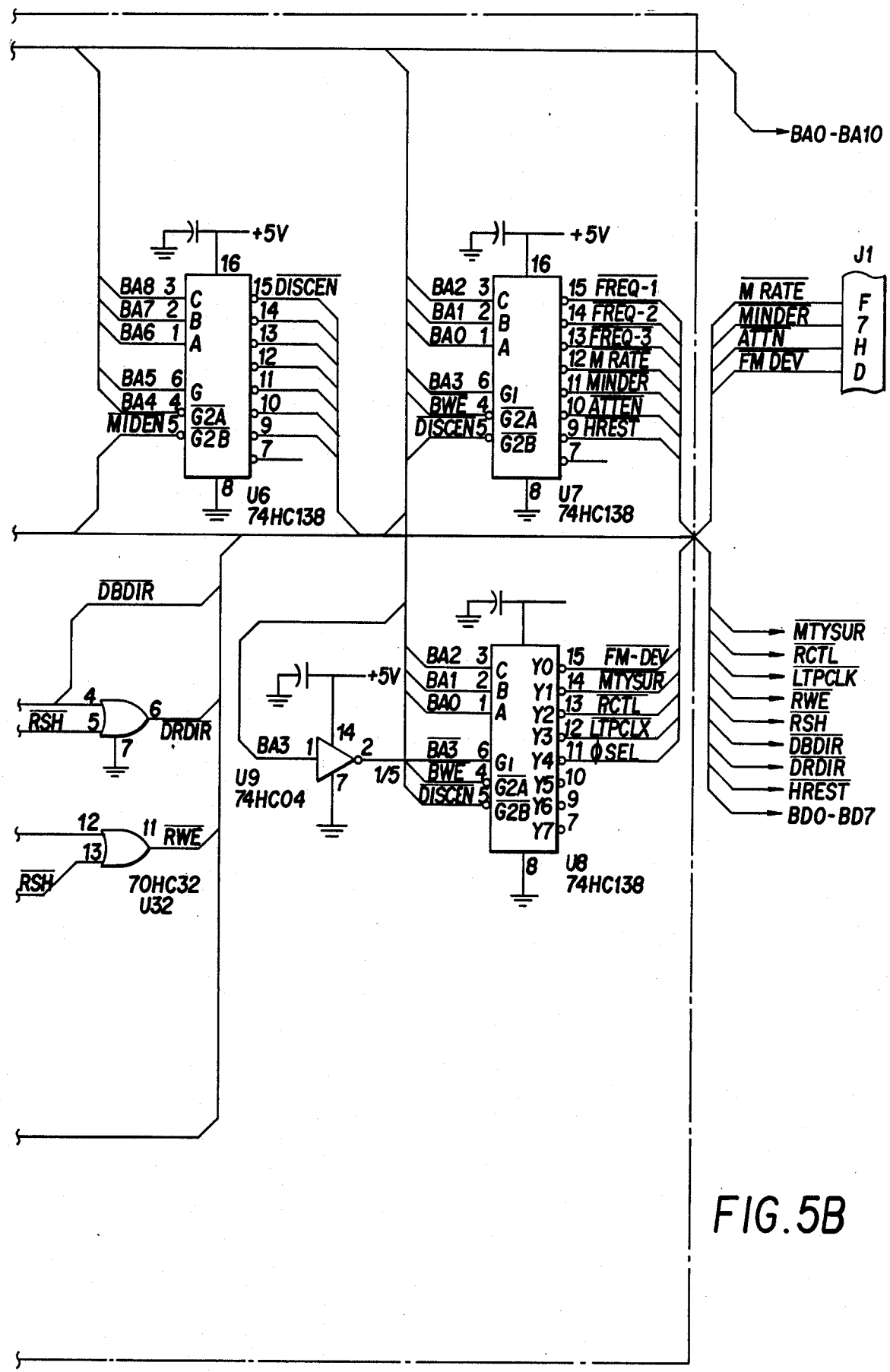
Figure 6A:
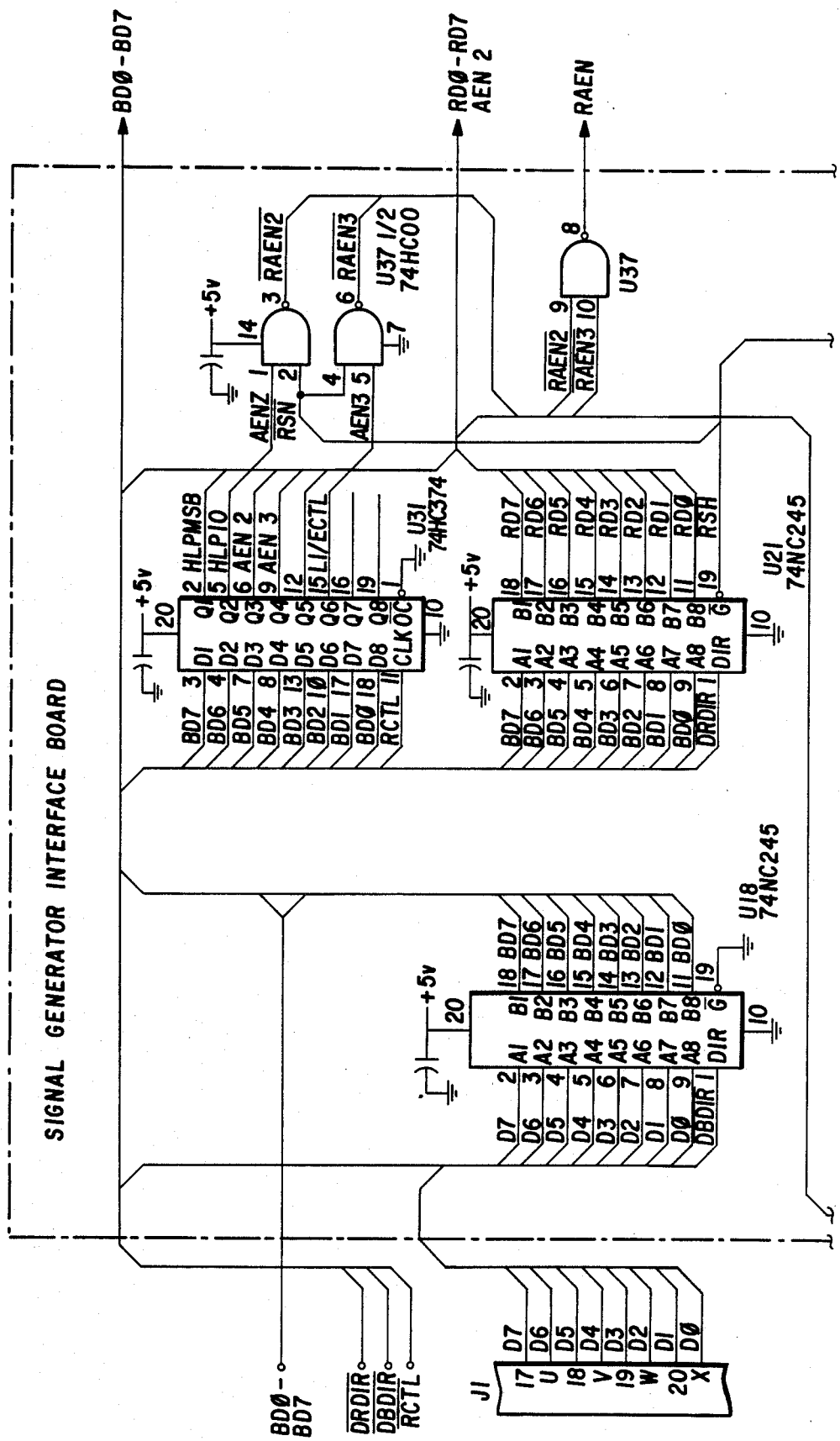
Figure 6B:
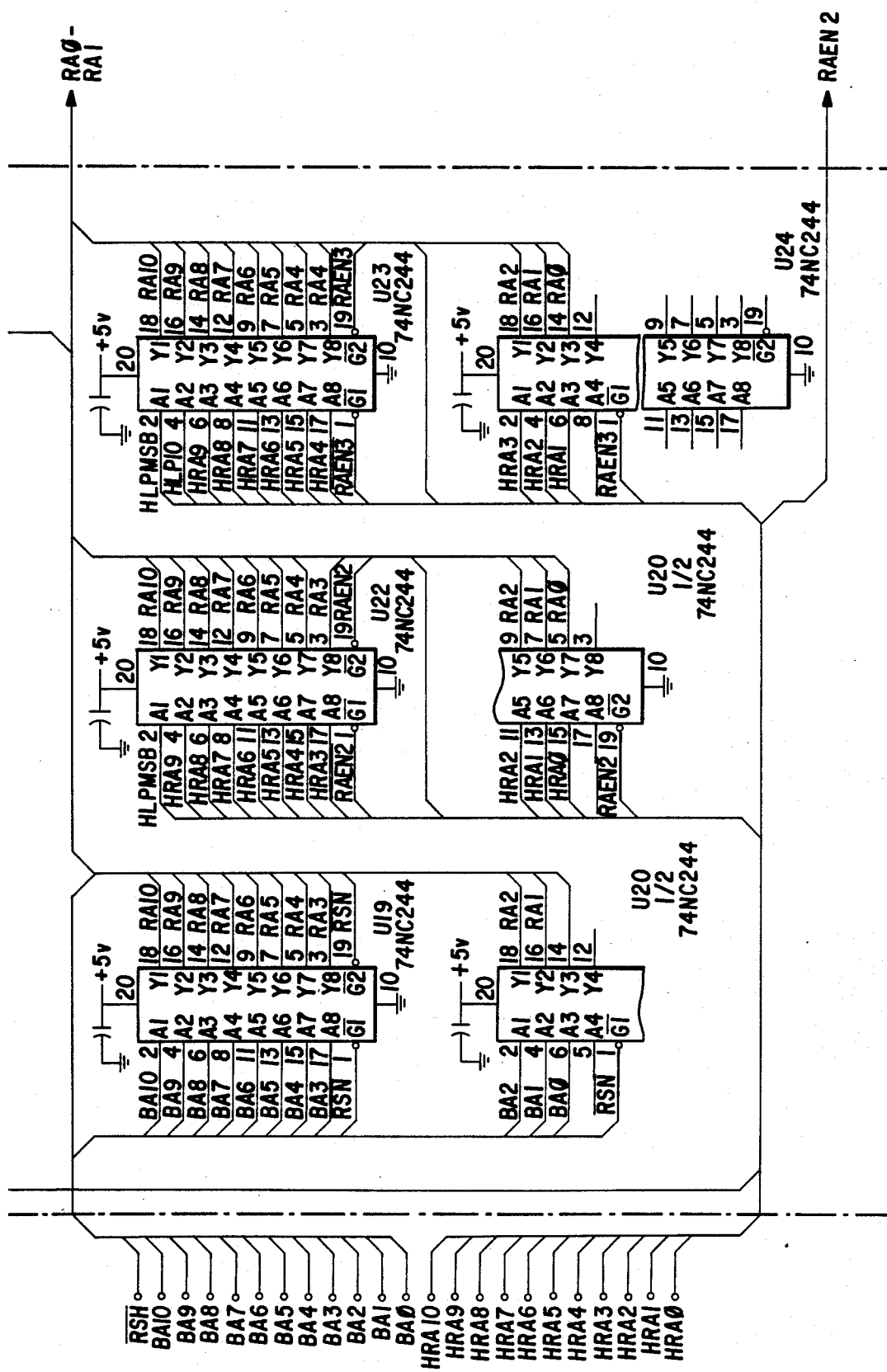
Figure 7A:
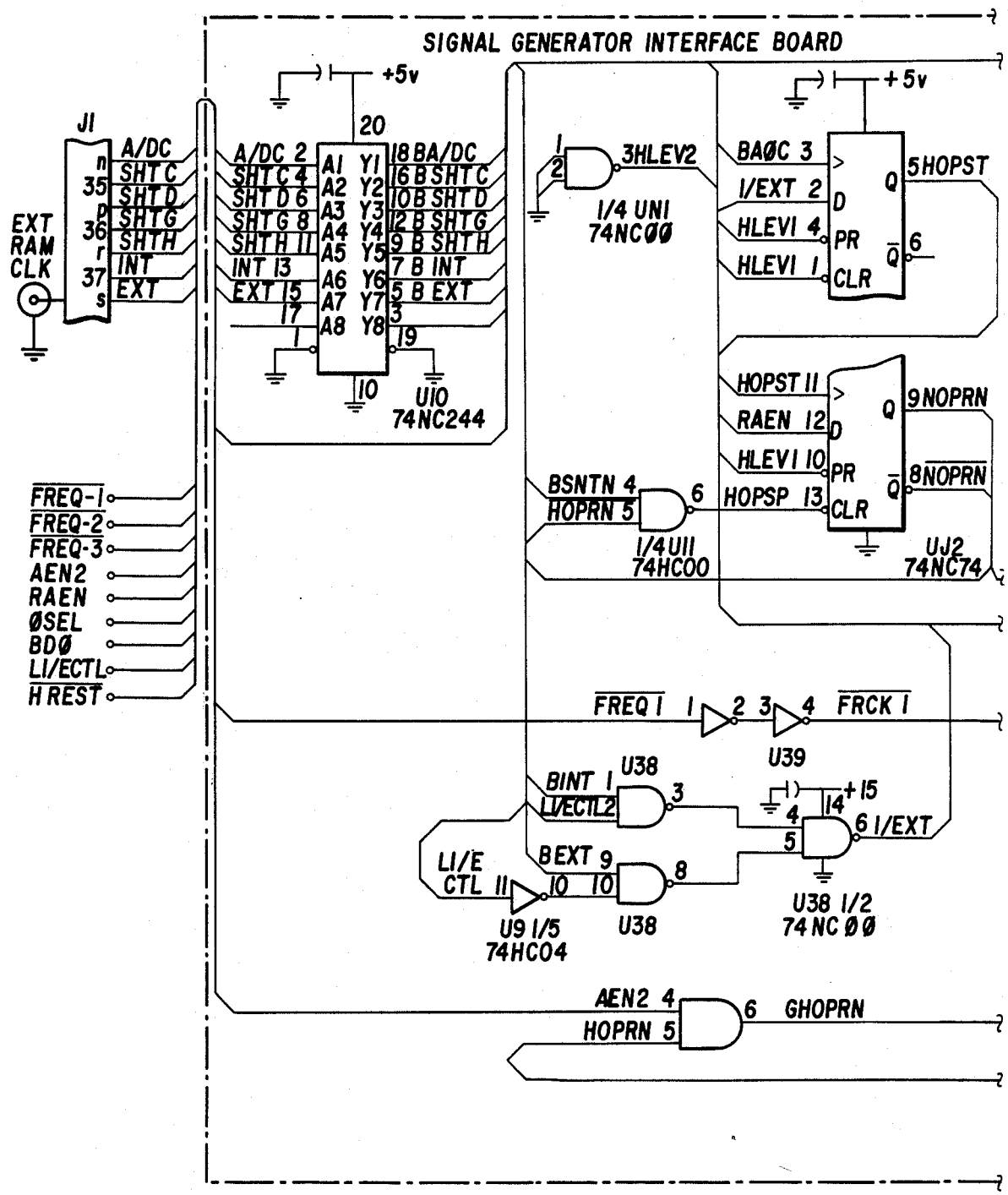
Figure 7B:
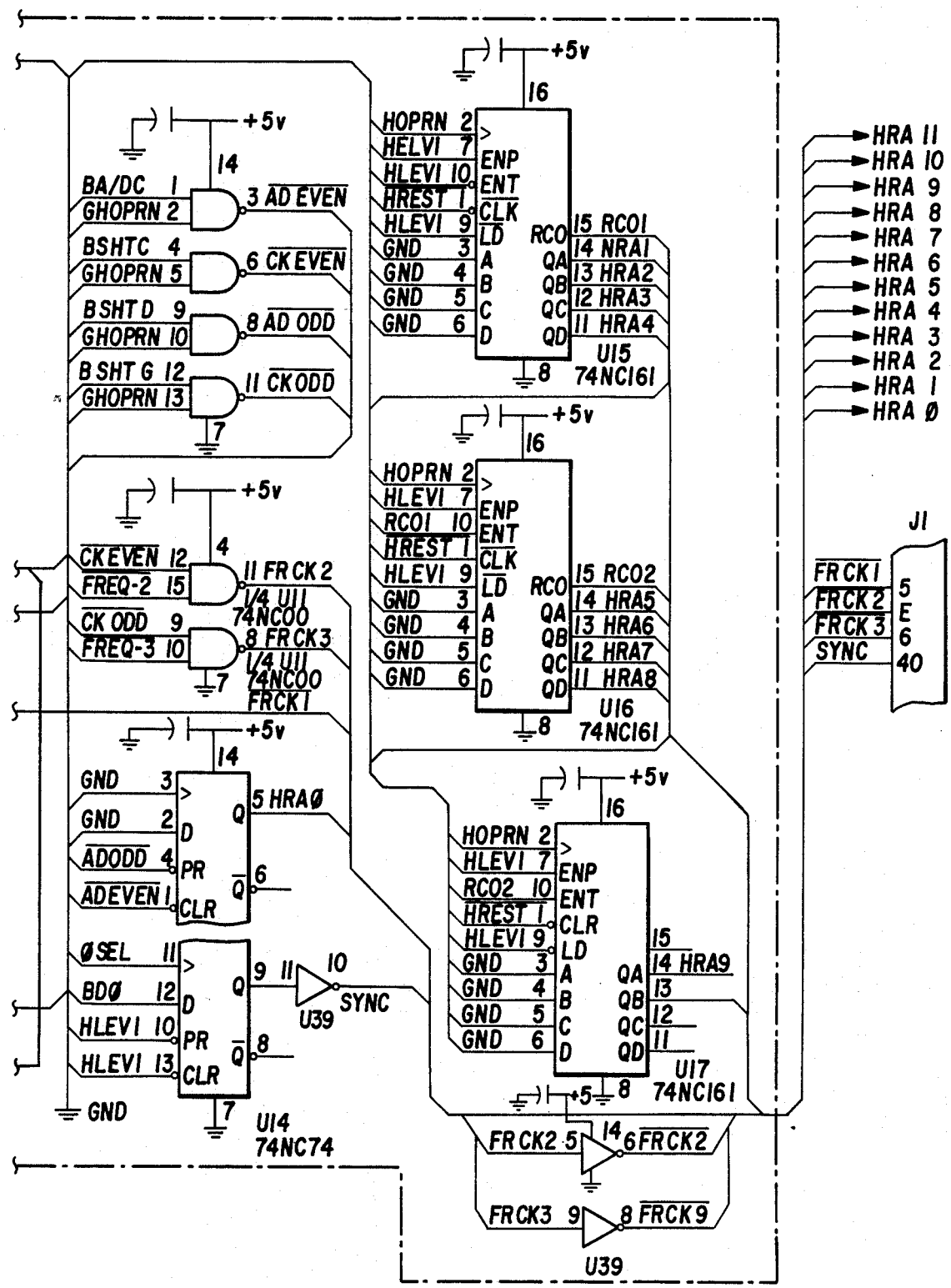
Figure 8:
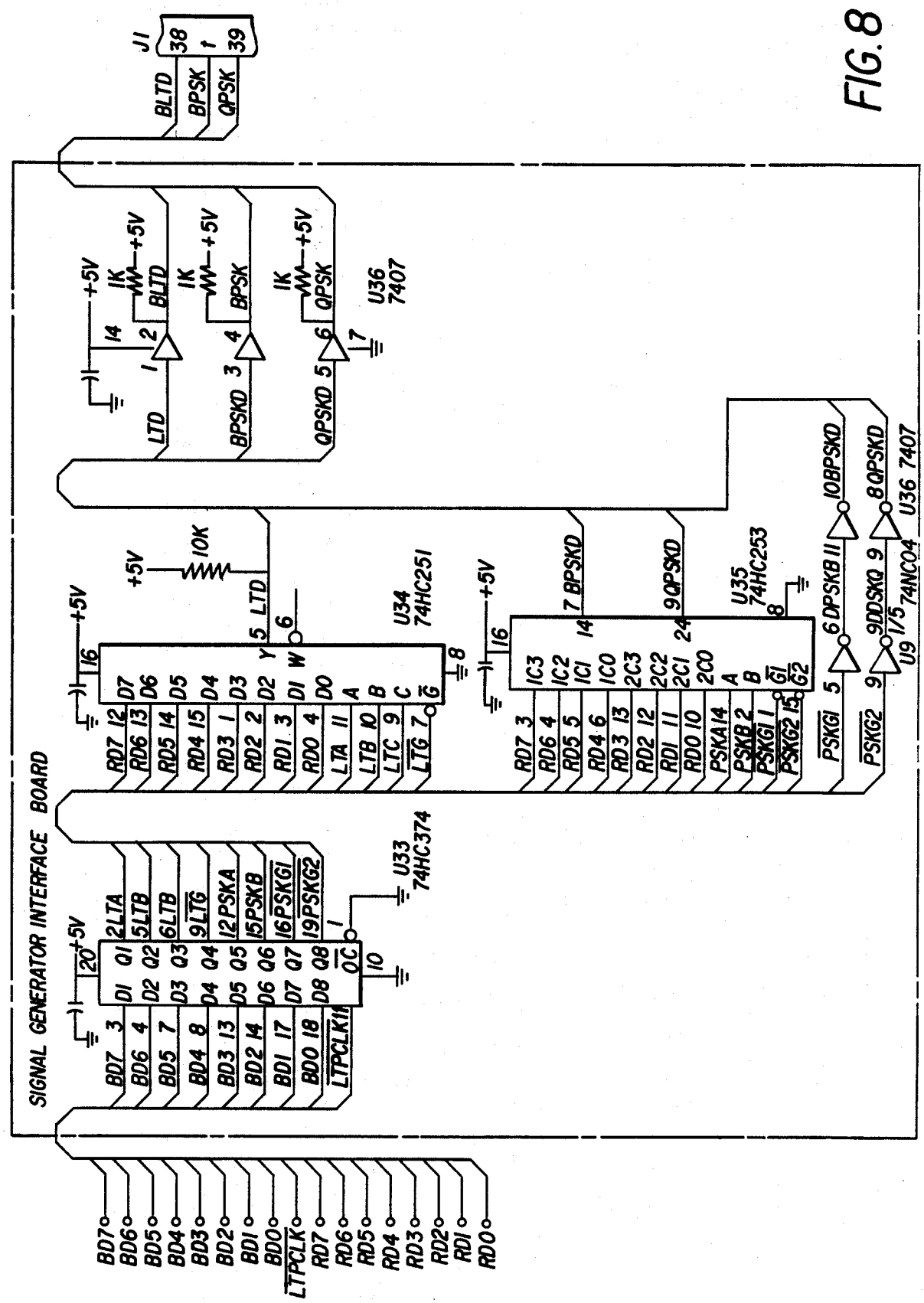
Figure 9A:
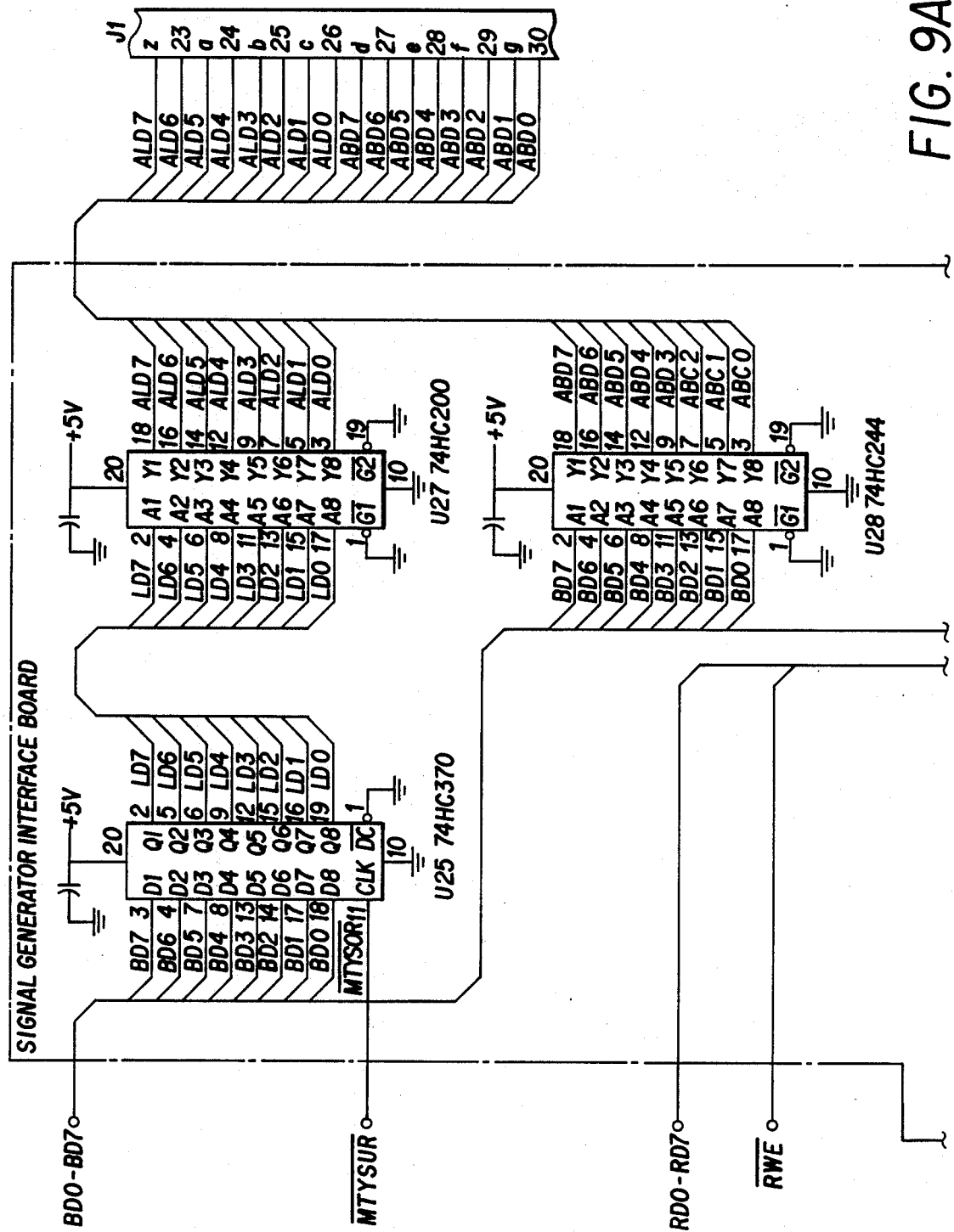
Figure 9B:
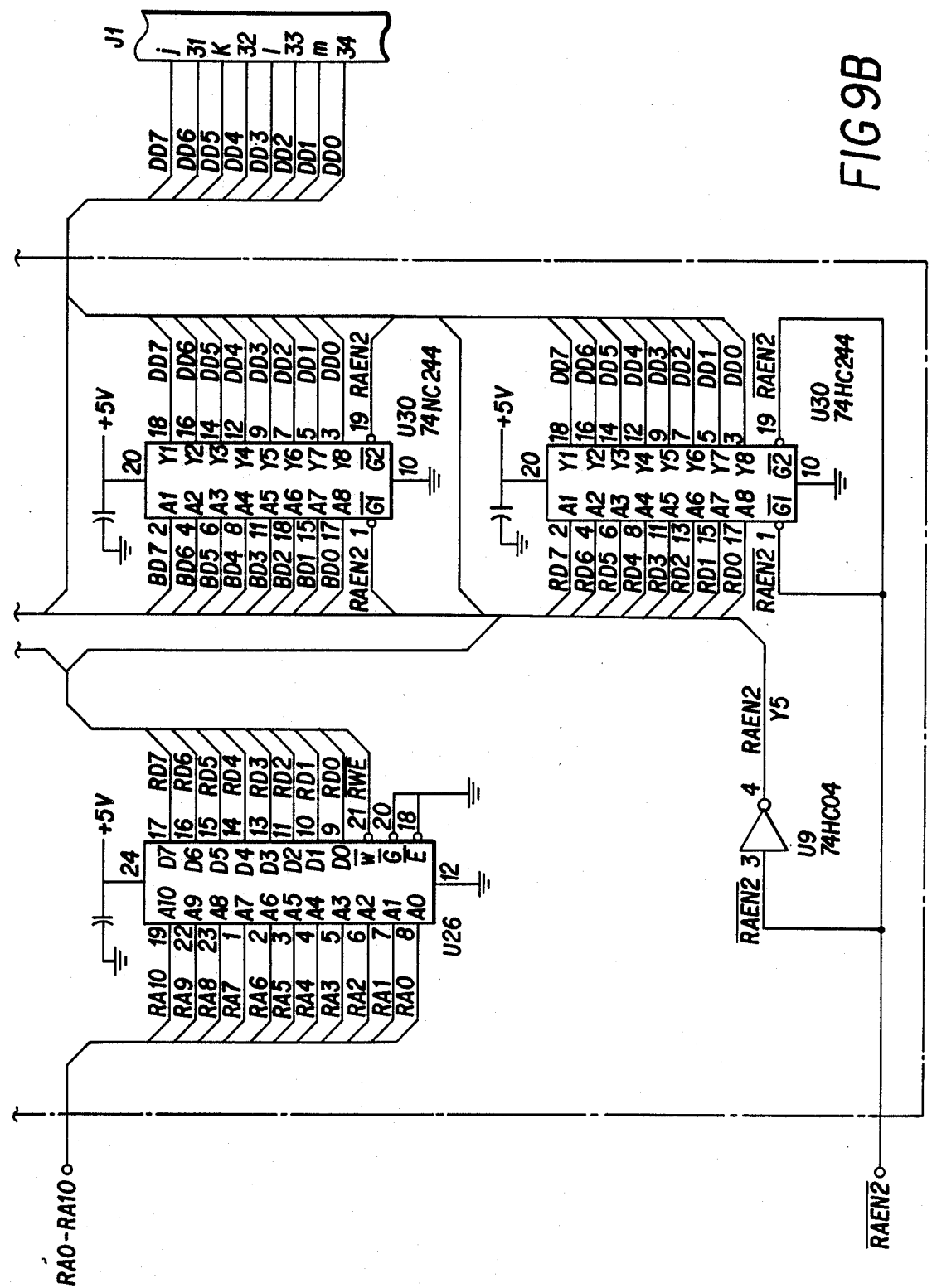

Generally, the computer input signals are used that control the signal generator by decoding the computer data (e.g., see FIG. 8) and addressing data stored in memory such as the illustrated EPROM U42 (FIG. 5). Appropriate buffering of the computer data and transfer of that data to the signal generator circuits on other boards is provided by buffers such as U1, U2, U3, etc. (FIG. 5) and latches U31, U33 etc. (FIGS. 6 and 8). The computer data bus also is connected to a bidirectional buffer U18 (FIG. 6) so that the information read from the EPROM (BD0–BD7) can be used for control and read by the computer thereby effectively expanding computer memory. There are, of course, other conventional approaches to interfacing and memory expansion, depending upon the type of computer used and the particular hardware configuration controlled by the computers. Therefore, the specific interface shown is for illustrative purposes to show the details of one approach using readily available integrated circuit packages and components.

Digital Board Detail (FIGS. 10-14)

Figure 11:
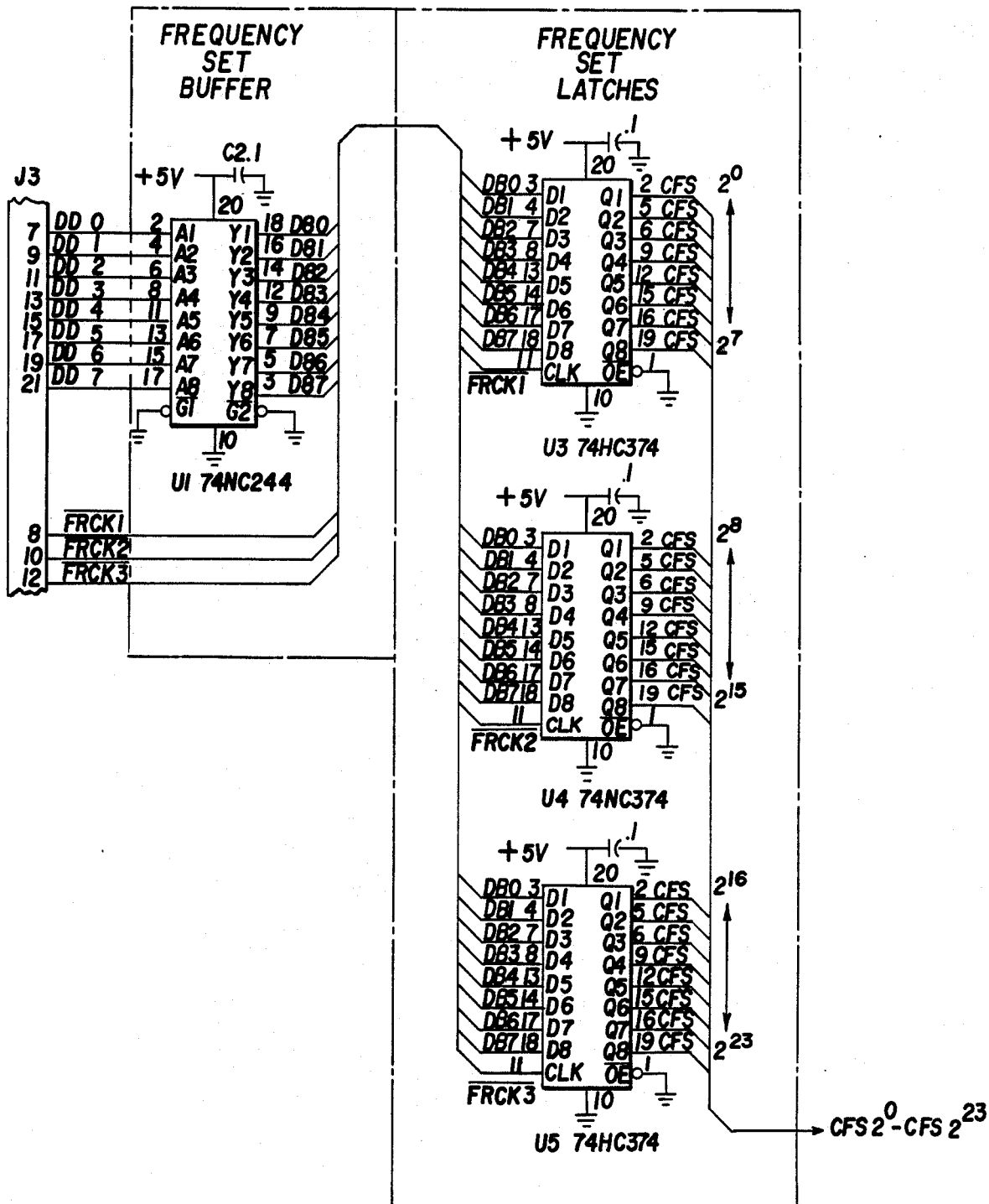
FIG. 11 is a schematic diagram of the frequency control circuit on the digital board of FIGS. 1 and 4.

Referring first to FIG. 11, the frequency control circuit 24, which produces the digital base frequency control signal $CFS2-CFS2^{23}$, comprises a frequency set buffer and frequency set latches. The buffer receives digital frequency-related data from the interface 14, and three buffered data words are clocked into the three 8-bit latches by the FRCK1(−), FRCK2(−), and FRCK3(−) signals to form a 24-bit base frequency control word.

Figure 10:
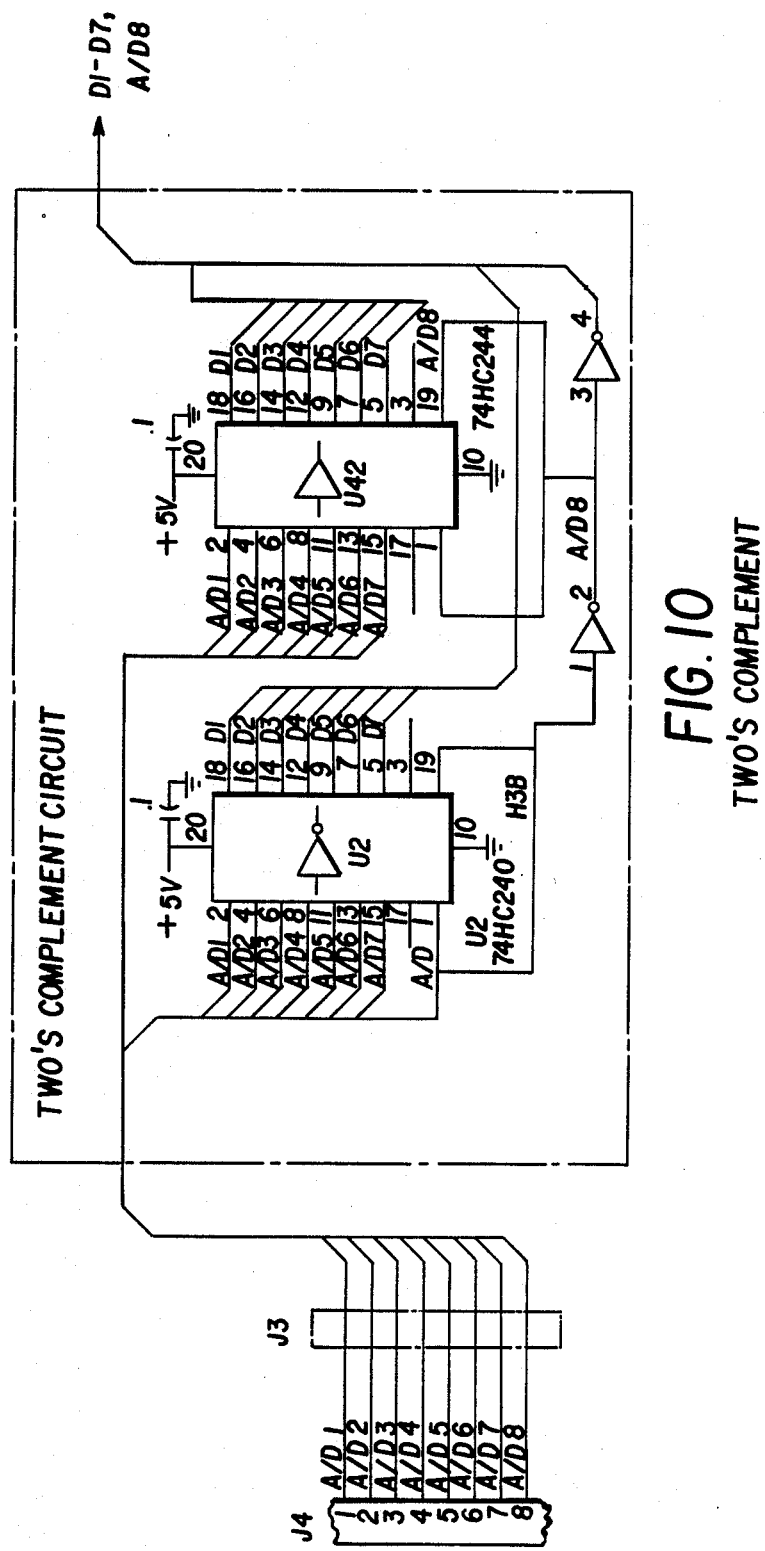
FIG. 10 is a schematic diagram of the two's complement circuit on the digital board of FIGS. 1 and 4.
Figure 12B:
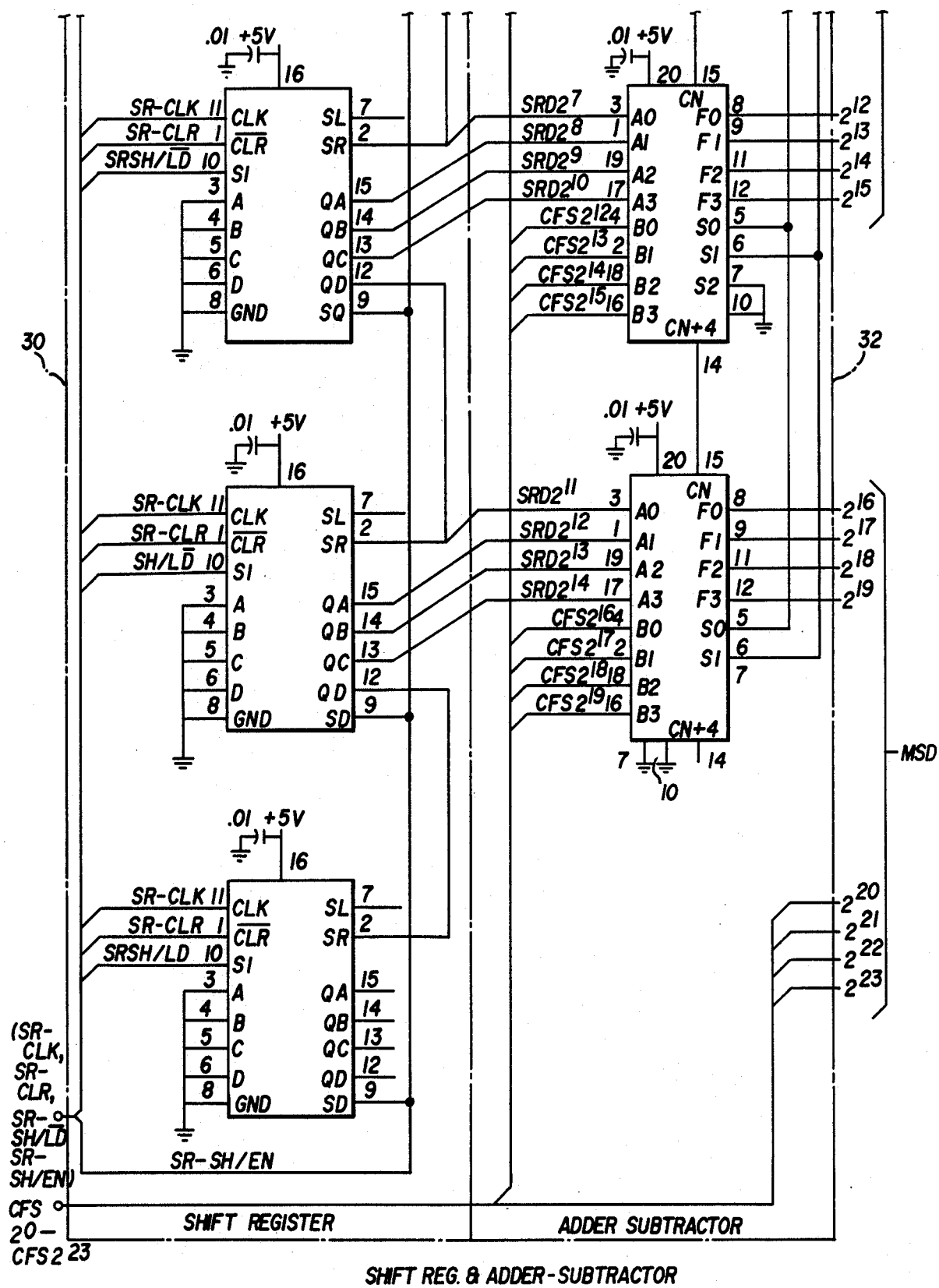
FIG. 12 is a schematic diagram of the shift register and adder/subtractor circuits on the digital board of FIGS. 1 and 4.

Referring now to FIGS. 10 and 12, the digital modulation signals A/D1–A/D8 from the A/D converter are supplied through a conventional two's complement circuit, such as that illustrated in FIG. 10 to produce the two's complement of that signal. The D1–D7 and A/D8 output signals from the two complement circuit are applied to the shift register 30 (FIG. 12) controlled by timing signals TMG from the timing circuit 26 described hereinafter in greater detail in connection with FIG. 15. In particular, the shift register 30 receives a clock signal SR-CLK, a clear signal SR-CLR, a shift-/load signal SR-SH/LD(−), and a shift enable signal SR-SH/EN from the timing circuit.

The shift register 30 receives the digital modulation signal in the time domain, i.e. each digital sample of the modulation signal represents the amplitude of the modulation at the sampling time. The shift register converts the time domain information into frequency domain information. In particular, the incoming digital modulation signal is shifted into and through the register so that the shift register output signal represents the frequency rate of change of the modulation signal.

The frequency related modulation signal from the shift register is supplied to the adder/subtractor 32 together with the base frequency control signal $CFS2-CFS2^{23}$ from the frequency control circuit 24 of FIG. 11. The adder/subtractor algebraically sums the digital modulation and base frequency control signals and supplies the modulated base frequency control signal LSD, CSD, MSD to the latches 34 of FIG. 13. If the two's complement of the modulation signal is supplied to the adder/subtractor as in the illustrated embodiment, the resultant output signal is the difference between the two input signals. In any event, the output signal is a digital frequency control signal comprising the base frequency control signal modified by the modulation signal.

Figure 13A:
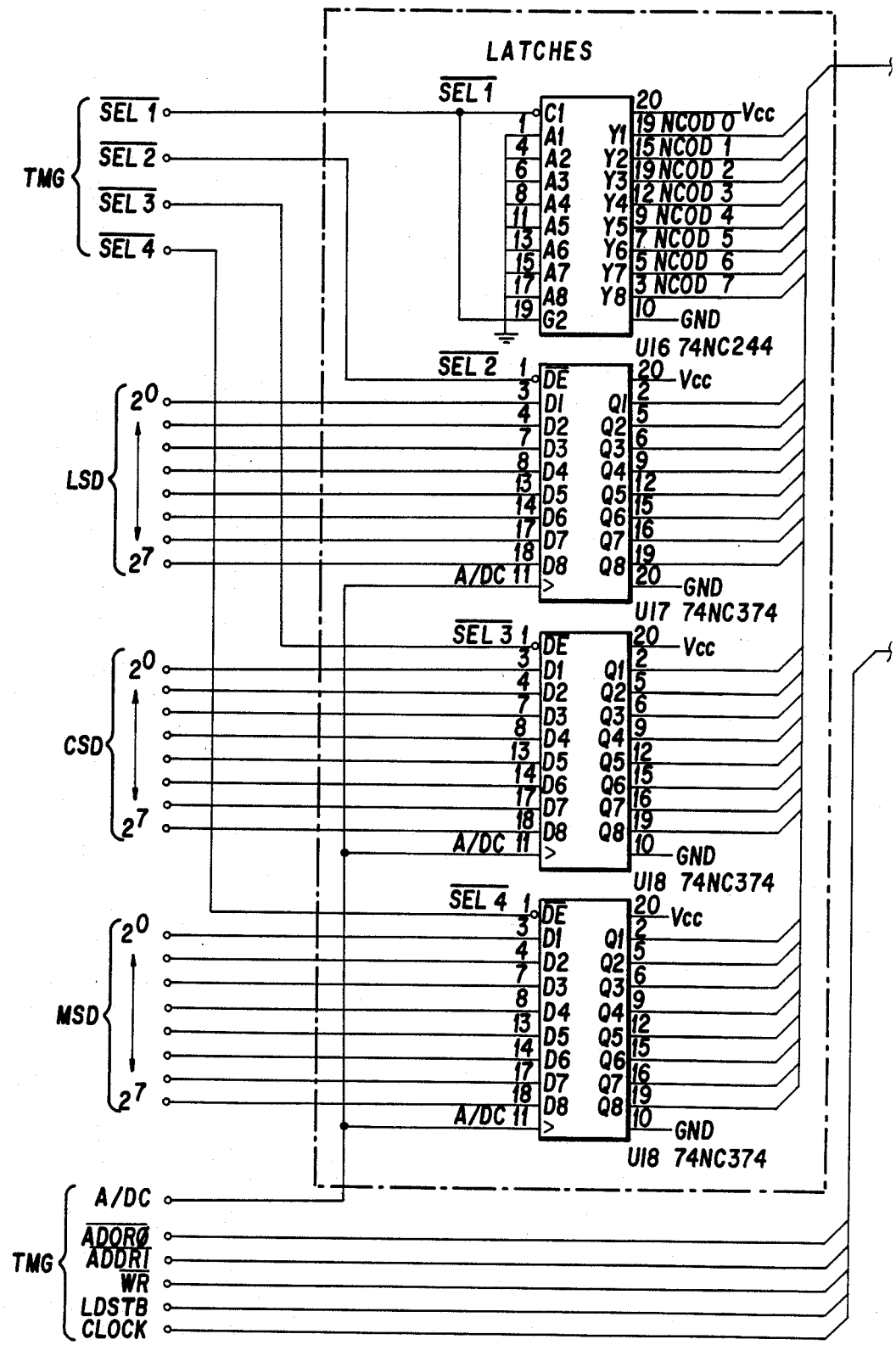
FIG. 13 is a schematic diagram of the latches and number controlled oscillator circuits on the digital board of FIGS. 1 and 4.
Figure 13B:
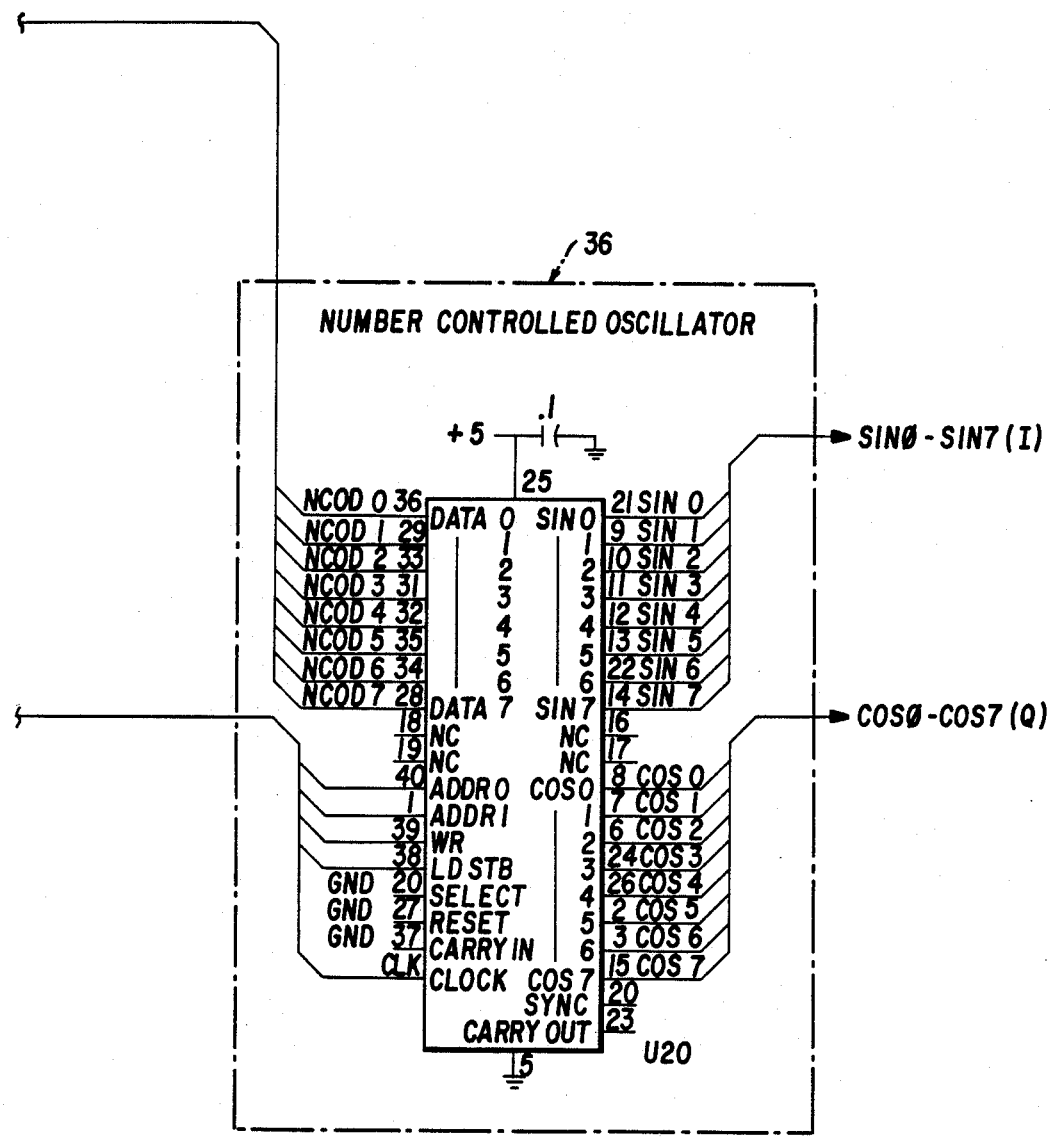

Referring now to FIG. 13, the latches 34 comprise four, conventional 8-bit latches. The first latch has all of its inputs grounded since the first eight bits of the frequency control signal for the NCO are unused as they are not needed for the resolution desired in accordance with the preferred embodiment. the next three 8-bit latches receive, respectively, the LSD, CDS, and MSD signals from the adder/subtractor 32 of FIG. 12. These signals are clocked into the latches by the timing signal A/D C from the timing circuit.

The select signals SEL1(−) to SEL4(−) sequentially bus as the NCOD0–NCOD7 signals. The timing signals ADDR0(−), ADDR1(−), WR(−) and LDSTB, as well as the clock signal CLK, from the clock and timing circuits 26 also are provided to the NCO 36.

As will be appreciated, the NCO 36 generates output signals which are trigonometric functions (sine and cosine) related to the input signals. In particular, the frequency of the output signals of the NCO will be determined by the digital input word and may vary from DC to one-half the clock frequency (e.g. from DC to 5 MHz with a 10 MHz clock). Therefore, both the sine and cosine signals are available, and these signals may be varied in frequency rapidly and over a large range in response to the modulated frequency control signal to produce a digital output word representing the instantaneous amplitude of an output which varies as a function of desired frequency characteristics.

Figure 14A:
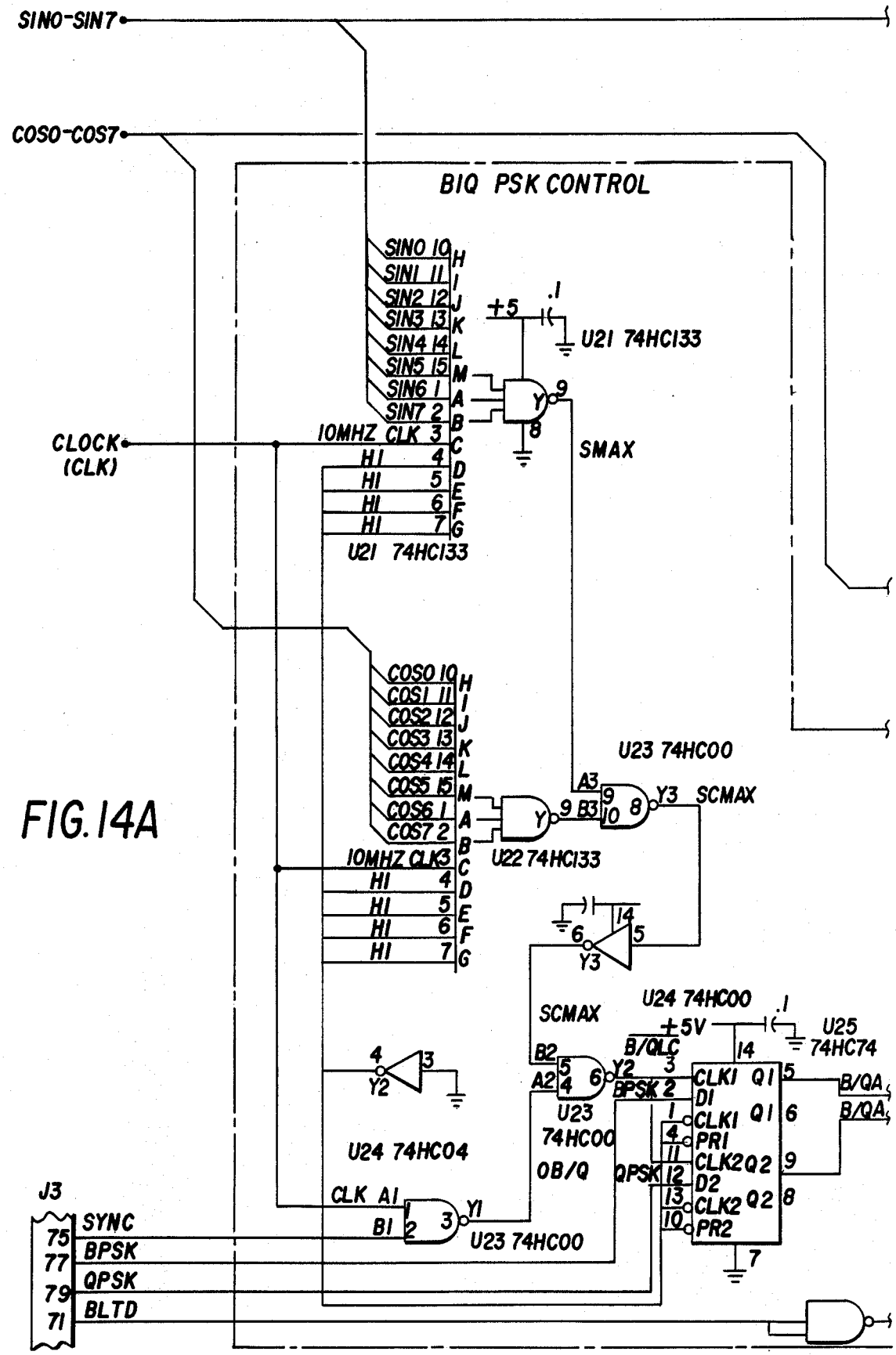
FIG. 14 is a schematic diagram of the function select circuit on the digital board of FIGS. 1 and 4.
Figure 14B:
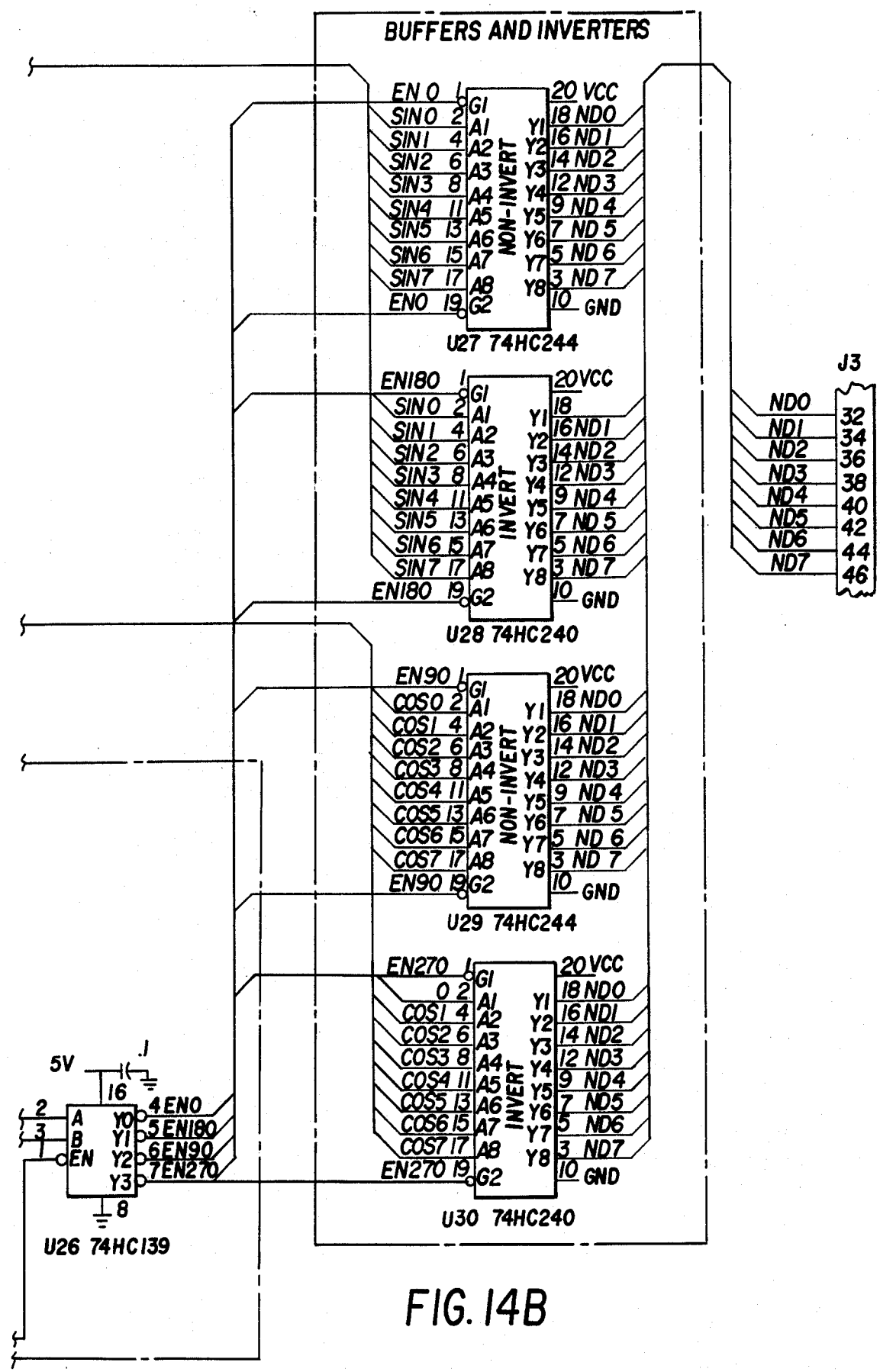

The SIN and COS output signals from the NCO are supplied to the function select circuit of FIG. 14 which allows any phase of the NCO output signal to be selected as the digital NCO output data. The SIN and COS signals are supplied to respective NAND gates which detect the 0, 90, 180, and 270 degree phases of the NCO output and controls a pair of flip-flops (U25) in accordance therewith. A binary decoder (U26) decodes the flip-flop output signals as the phase signals EN0, EN90, EN180, and EN270. These phase signals are provided to conventional buffers and inverters to select the SIN signal or its inverse, or the COS signal or its inverse. The selected signal is supplied to connector J3 as the output of the function select circuit for conversion to analog form by the analog board as is described hereinafter.

The clock circuit of the clock and timing circuits 26 of FIG. 1 is illustrated in greater detail in FIG. 15. It will be appreciated that any suitable, accurate clock source may be utilized to generate an appropriate clock signal for digital board timing. The illustrated clock circuit is a conventional crystal controlled, 10 MHz clock circuit suitably buffered and arranged so that an external clock may be substituted if desired.

Figure 16A:
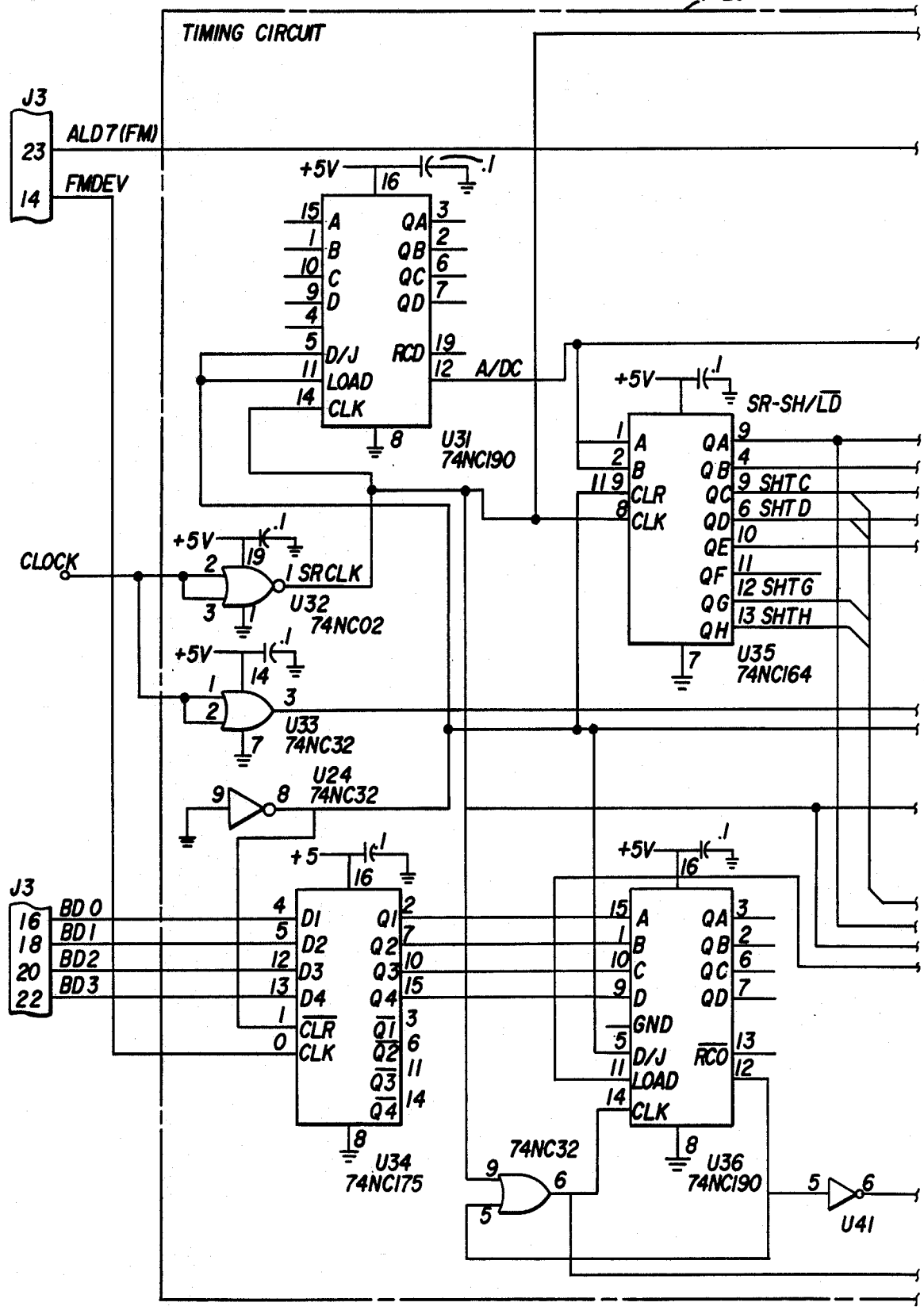
FIG. 16 is a schematic diagram of the timing circuit on the digital board of FIGS. 1 and 4.
Figure 16B:
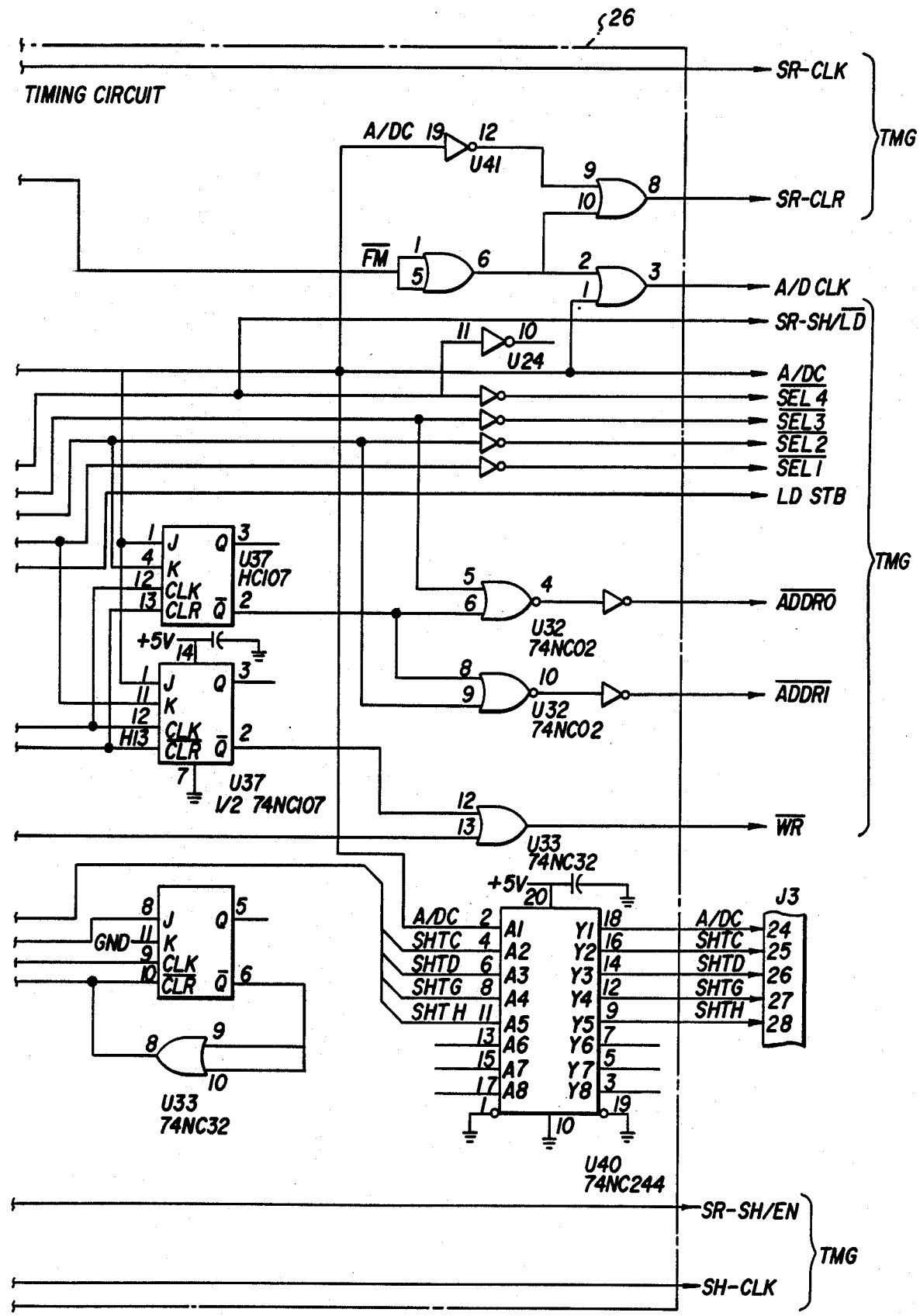

The clock signal from the clock circuit, together with commands from the interface 14, are supplied to the timing circuit portion of the clock and timing circuits 26 of FIG. 1, as is illustrated in detail in FIG. 16. A latch or buffer (U34) receives the BD0-BD3 signals from the interface and these signals are clocked into the latch by the FMDEV(−) signal. The output signals from the latch are supplied to a counter (U36) which produces the shift enable signal SR-SH/EN supplied to the shift register 30. Other counters, flip-flops, gates and inverters (shown with conventional logic symbols) similarly provide the other shift register timing signals and the timing signals used by other parts of the digital board as shown and described in connection with FIG. 1 and the more detailed schematics. In addition, the A/DC and SHTC-SHTH timing signals are sent to the interface board to coordinate the timing of the digital and interface boards, and the clock for the FM analog to digital converter, the A/D CLK signal, is sent to the FM A/D converter board 22 when not disabled by the FM(−) signal.

The FM A/D converter circuit on board 22 may be any conventional high speed A/D converter capable of converting the analog modulation signal MOD to digital form at the frequencies encountered in the particular application. One embodiment of a suitable A/D converter is illustrated, by way of example, in FIG. 17.

Figure 17:
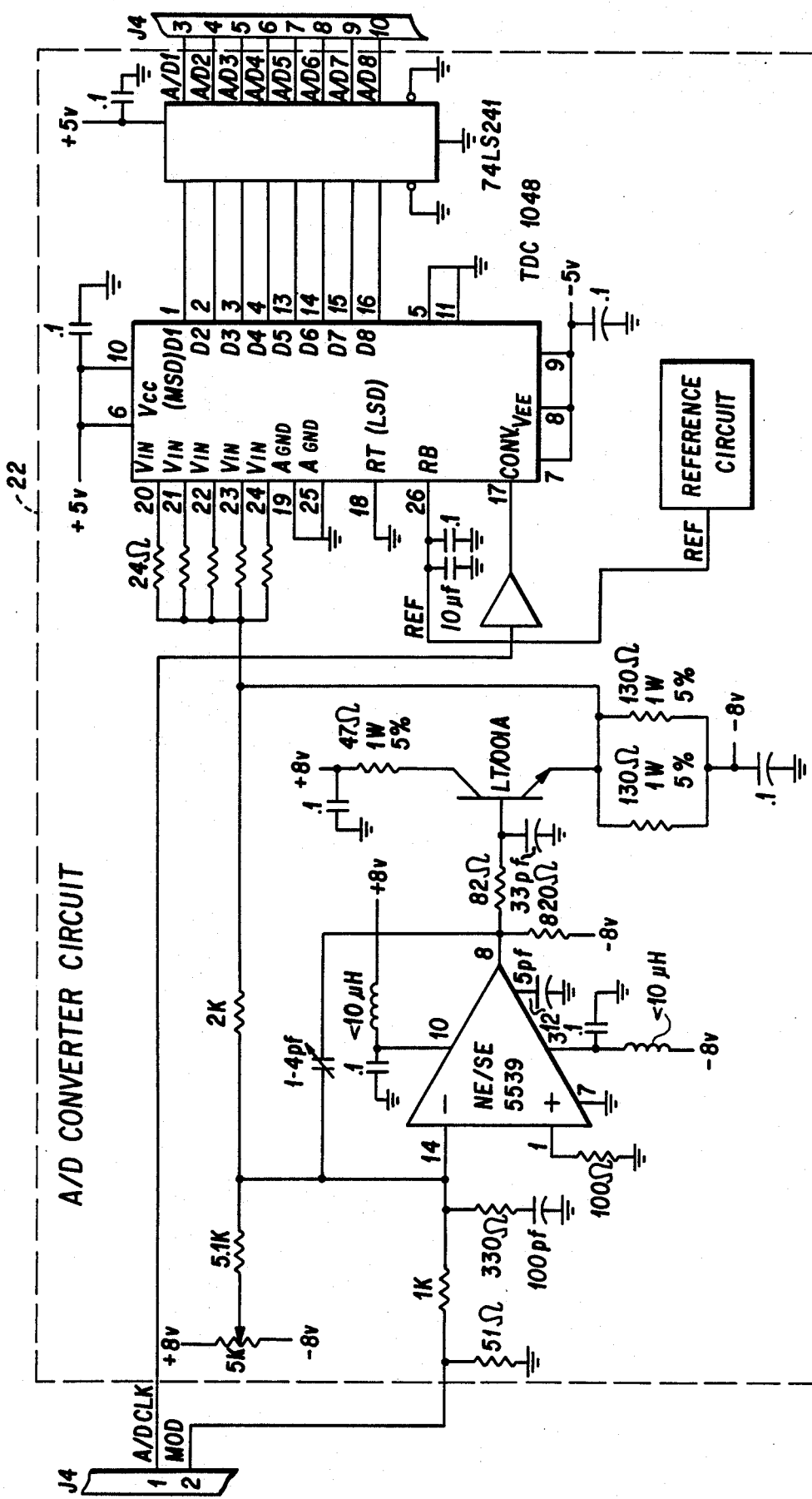
FIG. 17 is a schematic diagram of the FM analog to digital converter board of FIGS. 1 and 4.

Referring to FIG. 17, the analog modulation signal MOD from the analog board is applied through conventional high speed driver/translator circuit to the input terminals $V_{IN}$ of a conventional A/D converter. The reference voltage for the A/D converter is supplied from a suitable reference circuit and the clock for the converter is provided by the A/D clock from the timing circuit of FIG. 16. The digital output signal from the A/D converter is supplied to a suitable digital buffer and is supplied from the buffer to the connector J4 as the A/D1-A/D8 digital modulation signal.

Figure 18B:
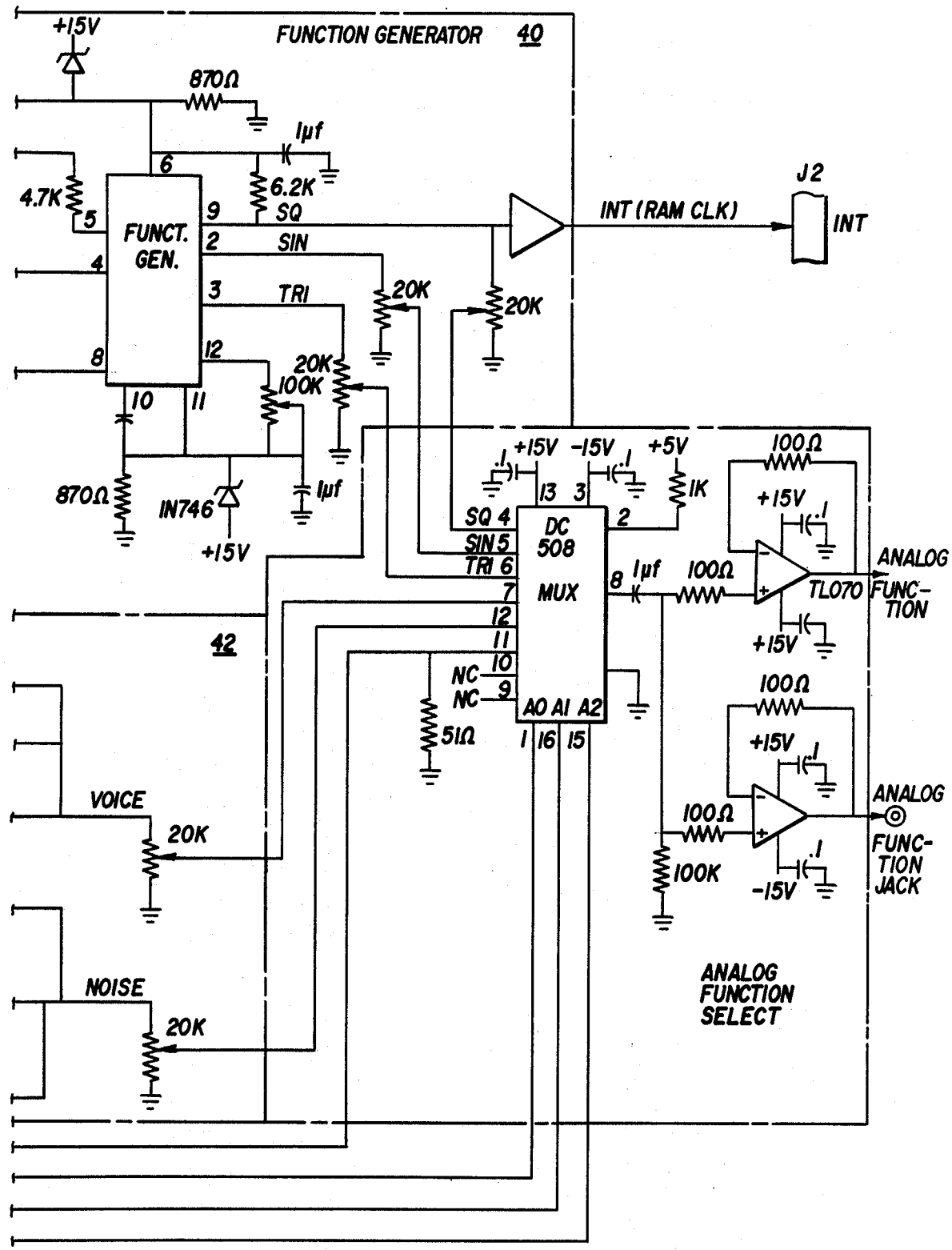
FIG. 18 is a schematic diagram of the function generator, noise source, filters, and analog select circuits on the analog board of FIGS. 1 and 4.
Figure 19A:
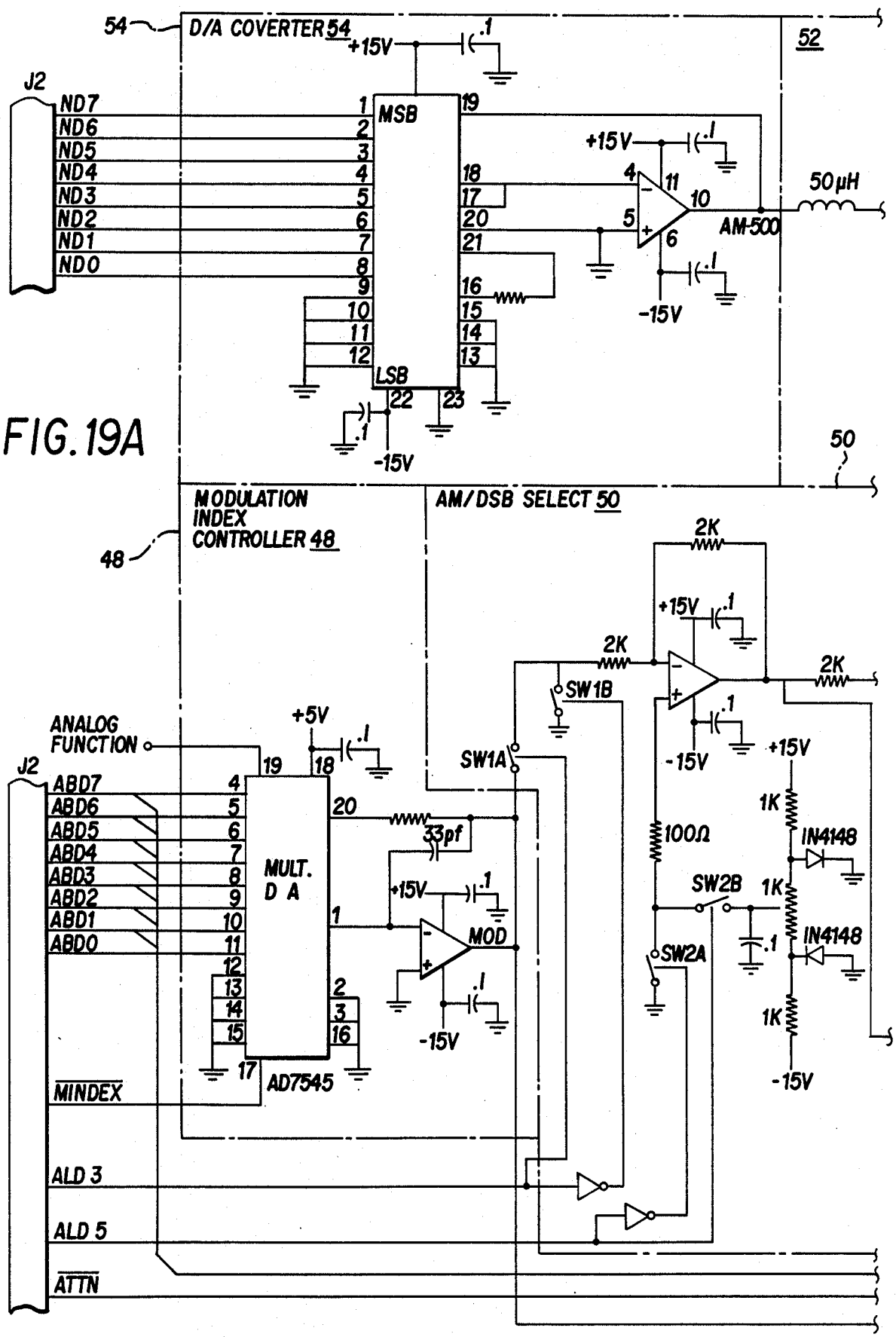
FIG. 19 is a schematic diagram of the D/A converter, mixer, modulation index controller, AM/DSB select circuit, signal controlled attenuator, and output amplifier on the analog board of FIGS. 1 and 4.
Figure 19B:
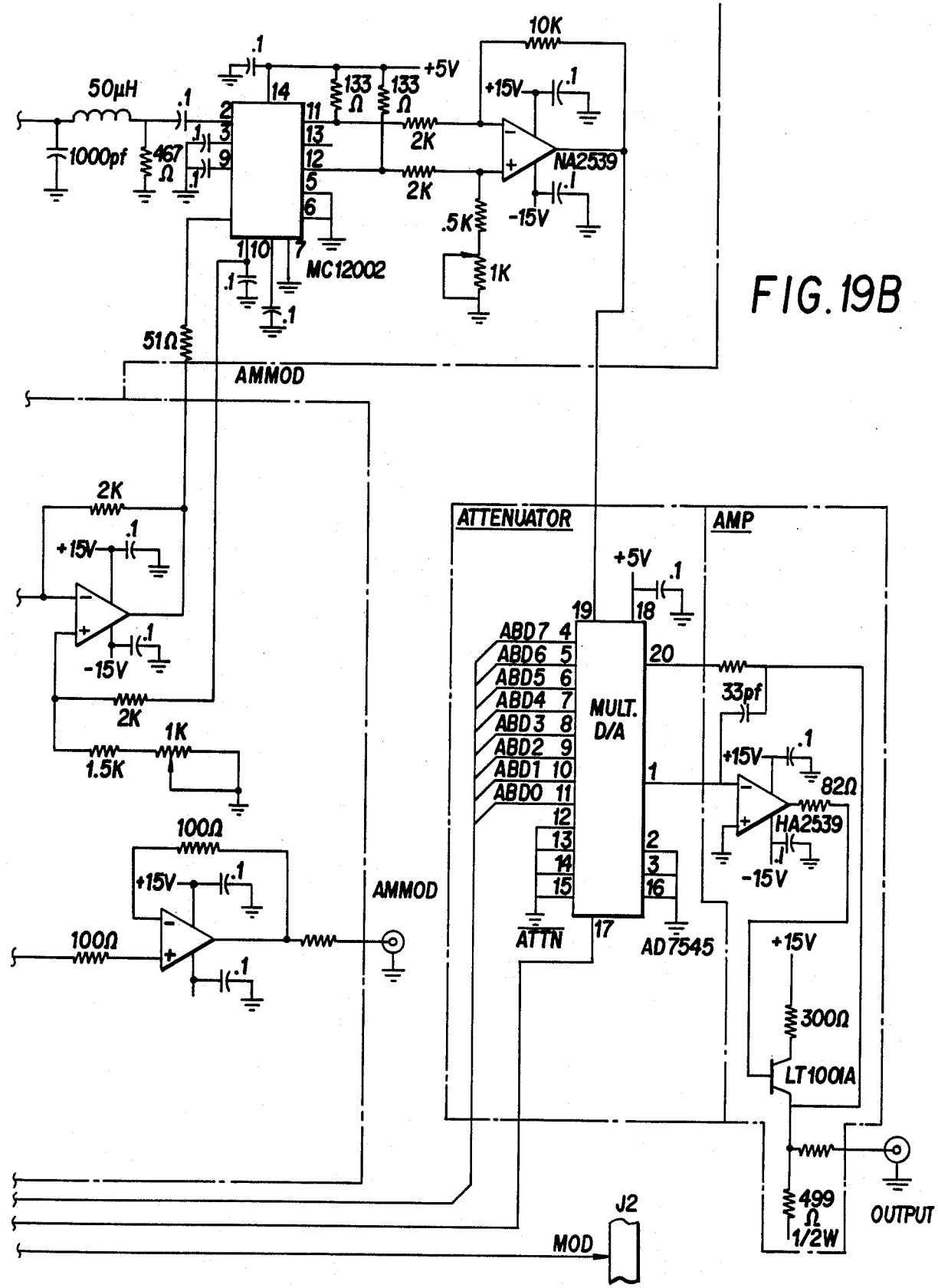

FIGS. 18 and 19 illustrate the circuits on the analog board 20 of FIG. 1 in greater detail. Specifically, FIG. 18 illustrates the function generator 40, the noise source and filters 42 and the analog function select circuit 46 of FIG. 1. FIG. 19 illustrates the D/A converter 54, the mixer 52, the modulation index controller 48, the AM/DSB select circuit 50, the attenuator 56, and the amplifier 58 of FIG. 1.

Referring to FIG. 18, The function generator 40 receives a digital command ABD0-ABD7 from the interface, and this signal is strobed into a conventional multiplying D/A circuit which creates an analog output signal having a frequency related to the digital command. The analog output signal from the D/A circuit is supplied to a convention function generator circuit which shapes the input signal and supplies a square wave output SQ, a sine wave output SIN, and a triangular waveform output TRI. It will be appreciated that additional waveshaps may be provided as desired, but these waveforms will suffice for most applications.

A conventional noise source 42 supplies a noise signal to filters which pass a voice band signal VOICE and a noise signal NOISE. The voice filter may be a conventional bandpass filter and the noise filter may be a conventional lowpass filter, for example a 50 KHz lowpass filter.

The output signals from the function generator 40 and the noise source and filters 42, as well as an external signal from the external modulation jack 44, are supplied to a conventional analog multiplexer 46. The command signals ALD0-ALD2 from the interface 14 command the selection of one of the multiplexer inputs as the analog output or ANALOG FUNCTION signal. For monitoring purposes, the ANALOG FUNCTION signal may be provided to an output jack as illustrated.

Referring to FIG. 19, the digital representation of the selected phase of the NCO output signal, the ND0-ND7 signal, is supplied to a conventional digital to analog converter 54 which supplies an analog version of that signal, the ANSIG signal, to the mixer 52. The mixer 52 operates conventionally to mix the ANSIG signal with the analog amplitude modulation signal AMMOD from the AM/DSB select circuit 50. The mixer output signal is then supplied to the attenuator 56 which comprises a multiplying D/A circuit, the attenuation of which is controlled by the ABD0-ABD7 command strobed into the multiplying circuit by the ATTN(−) signal. The attenuator output signal is supplied through a suitable amplifier 58 to the output terminal of the signal generator where it can be used to drive a transmitter or other suitable output device.

The modulation index controller and the AM/DSB select circuits 48 and 50 determine the modulation index of the amplitude modulation signal and select the modulation signal or an on/off control signal for application to the mixer 52. To control the modulation index, the controller 48 uses a multiplying D/A circuit which receives a digital command in response to the MINDEX(−) strobe signal and controls the level of the ANALOG FUNCTION in response thereto. The selection of that modulation signal or an on/off control (e.g., for lookthrough or pulse keying), the AM/DSB select circuit 50 uses conventional analog switches SWA and SWB controlled by the command signals ALD3 and ALD5 from the interface.

The principles, preferred embodiments and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

What is claimed is:

1. A signal generator for producing an output signal which emulates a communication signal of predetermined base frequency and modulation characteristics comprising:

means for generating digital command signals specifying the desired characteristics of the output signal;

means responsive to said digital command signals for generating a digital base frequency signal representing the base frequency of the output signal;

means responsive to said digital command signals for generating an analog modulation signal having desired modulation characteristics;

means responsive to said analog modulation signal for generating a digital modulation signal representing a desired modulation of said base frequency signal;

means for selectively modulating said digital base frequency signal with said digital modulation signal to produce a modulated digital base frequency signal;

a digital-to-analog converter for converting the modulated digital base frequency signal to an analog output signal; and means for selectively modulating the amplitude of the analog output signal in response to said analog modulation signal.

2. The signal generator of claim 1 wherein said means for generating said digital modulation signal comprises an analog-to-digital converter for converting said analog modulation signal to a first digital signal representing the amplitude of the analog signal at successive sampling intervals, and means for converting said first digital signal representing amplitude to a second digital signal representing the frequency rate of change of said analog signal, said second digital signal comprising said digital modulation signal.

3. The signal generator of claim 2 wherein said means for generating digital command signals comprises a programmed digital computer for generating data signals in response to input commands in accordance with a predetermined program, input means for entering into said computer input commands which specify at least the type of modulation and center frequency of the output signal, and interface means for generating said command signals in response to said data signals.

4. The signal generator of claim 3 wherein said means for generating said analog modulation analog signal comprises function generating means for generating a plurality of different analog signal waveforms, and means for selecting one of said plurality of analog signals in response to said digital command signals.

5. The signal generator of claim 4 wherein said means for selectively modulating the amplitude of said analog output signal comprises mixer means for mixing the analog output signal with the analog modulation signal to amplitude modulate the analog output signal, and further including attenuating means for selectively attenuating said modulated analog output signal in response to said digital command signals.

6. The signal generator of claim 2 wherein said means for converting said amplitude representative first digital signal to said frequency rate representative second digital signal comprises a shift register for selectively shifting the bits of the amplitude representative first digital signal to positions representing a multi-bit frequency rate data word.

7. The signal generator of claim 1 wherein said digital base frequency signal generating means comprises means for generating a digital frequency control signal in response to said digital command signals, and a number controlled oscillator which generates first and second multi-bit digital signals, one of said multi-bit digital signals varying in value as the sine of the digital frequency control signal and the other of said multi-bit digital signals varying in value as the cosine of the digital frequency control signal, and wherein said digital base frequency signal generating means further comprises means for selecting one or the other of multi-bit digital signals as the digital base frequency signal.

8. The signal generator of claim 7 wherein said means for generating digital command signals comprises a programmed digital computer for generating data signals in response to input commands in accordance with a predetermined program, input means for entering into said computer input commands which specify at least the type of modulation and center frequency of the output signal, and interface means for generating said command signals in response to said data signals.

9. The signal generator of claim 7 including means for selectively adding or subtracting said digital modulation signal and said digital frequency control signal to produce a modulated digital frequency control signal for application to said number controlled oscillator.

10. The signal generator of claim 1 wherein said means for generating digital command signals comprises a programmed digital computer for generating data signals in response to input commands in accordance with a predetermined program, input means for entering into said computer input commands which specify at least the desired modulation characteristics and center frequency of the output signal, and interface means for generating said command signals in response to said data signals.

11. The signal generator of claim 1 wherein said means for generating said analog modulation signal comprises function generating means for generating a plurality of different analog signal waveforms, and means for selecting one of said plurality of analog signals in response to said digital command signals.

12. The signal generator of claim 1 wherein said means for selectively modulating the amplitude of said analog output signal comprises mixer means for mixing the analog output signal with the analog modulation signal to amplitude modulate the analog output signal, and further including attenuating means for selectively attenuating said modulated analog output signal in response to said digital command signals.

13. The signal generator of claim 1 wherein said means for generating said analog modulation signal comprises function generating means for generating a first plurality of different analog signal waveforms, means for generating a second plurality of analog signal waveforms including a noise signal of predetermined bandwidth and a voiceband signal, and means for selecting one analog signal waveform of said first and second plurality of analog signal waveforms in response to said digital command signals.

14. A frequency agile signal generator for producing an output signal which emulates a communication signal of predetermined base frequency and modulation characteristics comprising:

a programmed digital computer for generating data signals in response to input commands in accordance with a predetermined program;

input means for entering into said computer input commands which specify at least a desired type of modulation and center frequency of the output signal;

interface means for generating digital command signals in response to the data signals from said digital computer;

means responsive to said digital command signals for generating a digital frequency control signal representing the base frequency of the output signal;

means responsive to said digital command signals for generating an analog modulation signal having desired frequency and waveform characteristics;

means responsive to said analog modulation signal for generating a digital modulation signal representing a desired frequency modulation of said base frequency;

means for arithmetically combining said digital frequency control signal and said digital modulation signal to produce a digital, modulated base frequency control signal representing a desired modulated base frequency characteristic of the output signal;

number controlled oscillator means responsive to said digital, modulated base frequency control signal for generating a digital output signal varying in value as a trigonometric function of the digital modulated base frequency control signal;

a digital-to-analog converter for converting the digital output signal to an analog output signal; and, means for selectively modulating the amplitude of the analog output signal with said analog modulation signal in response to said digital command signals.

15. The signal generator of claim 14 wherein said means for generating said analog modulation signal comprises function generating means for generating a first plurality of different analog signal waveforms, means for generating a second plurality of analog signal waveforms including a noise signal of predetermined bandwidth and a voiceband signal, and means for selecting one analog signal waveform of said first and second plurality of analog signal waveforms in response to said digital command signals.

16. The signal generator of claim 15 wherein said number controlled oscillator means generates first and second digital output signals, one of said digital output signals varying in value as the sine of the digital, modulated base frequency control signal and the other of said digital output signals varying in value as the cosine of the digital, modulated base frequency control signal, and wherein said signal generator further comprises means for selecting one of said first and second digital signals as the output of said number controlled oscillator means.

17. The signal generator of claim 14, wherein said means for generating the digital frequency control signal includes means for changing said digital frequency control signal such that said digital frequency control signal hops from value to value in accordance with a predetermined pattern to thereby produce a digital frequency control signal representing frequency hopping of the base frequency of the output signal.

18. The signal generator of claim 14, including means connected to said selective amplitude modulating means for generating an on/off control signal to selectively pass and block the analog output signal.

19. The signal generator of claim 18, wherein said analog modulation signal is a noise signal and wherein said analog output signal is amplitude or frequency modulated by said noise signal.

* * * * *